Figure 1:
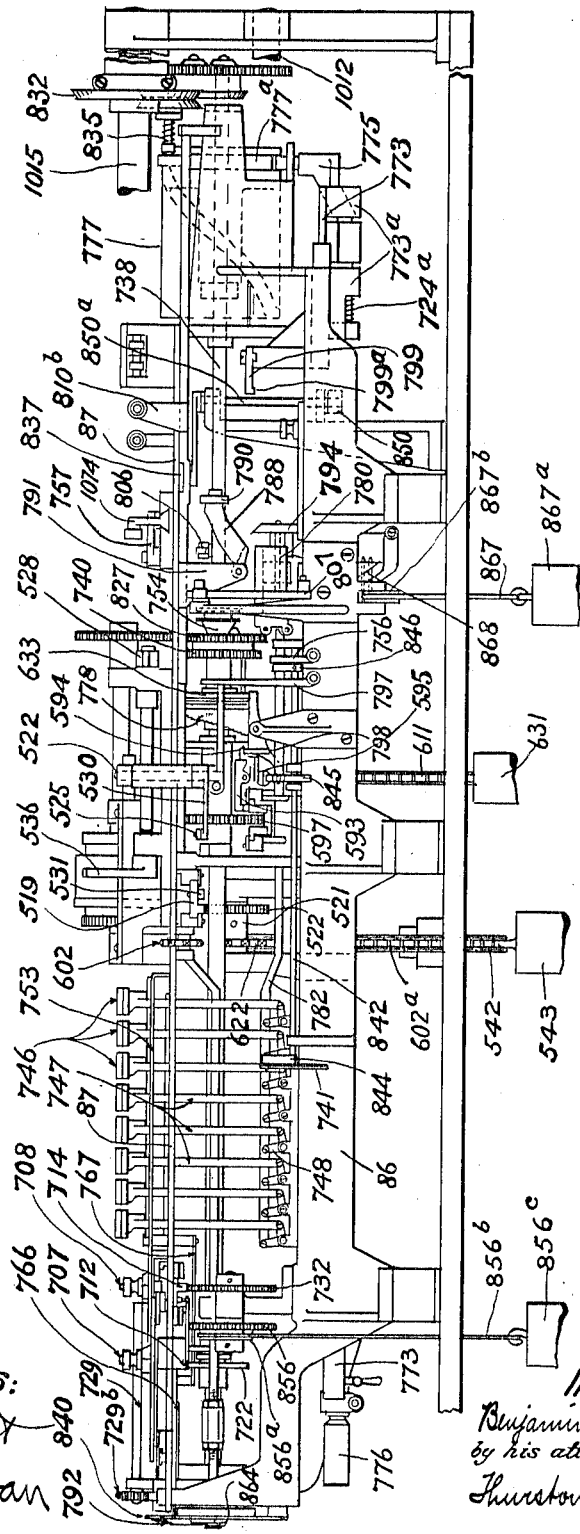

B. F. BELLOWS.
JUSTIFYING MECHANISM.
APPLICATION FILED JUNE 8, 1911.

1,082,006.

Patented Dec. 23, 1913.
20 SHEETS—SHEET 3.

WITNESSES:
E. B. Gilchrist
H. R. Sullivan

INVENTOR:
Benjamin F. Bellows
by his attorneys,
Thurston & Kwis

B. F. BELLOWS.
JUSTIFYING MECHANISM.
APPLICATION FILED JUNE 8, 1911.

1,082,006.

Patented Dec. 23, 1913.
20 SHEETS—SHEET 5.

Fig. 5.

WITNESSES:

INVENTOR:
Benjamin F. Bellows
by his attorneys
Thurston & Kwis

B. F. BELLOWS.
JUSTIFYING MECHANISM.
APPLICATION FILED JUNE 8, 1911.

1,082,006.

Patented Dec. 23, 1913.
20 SHEETS—SHEET 6.

Fig. 6.

WITNESSES:
E. B. Gilchrist
H. P. Sullivan

INVENTOR:
Benjamin F. Bellows
by his attorneys,
Thurston & Kwis

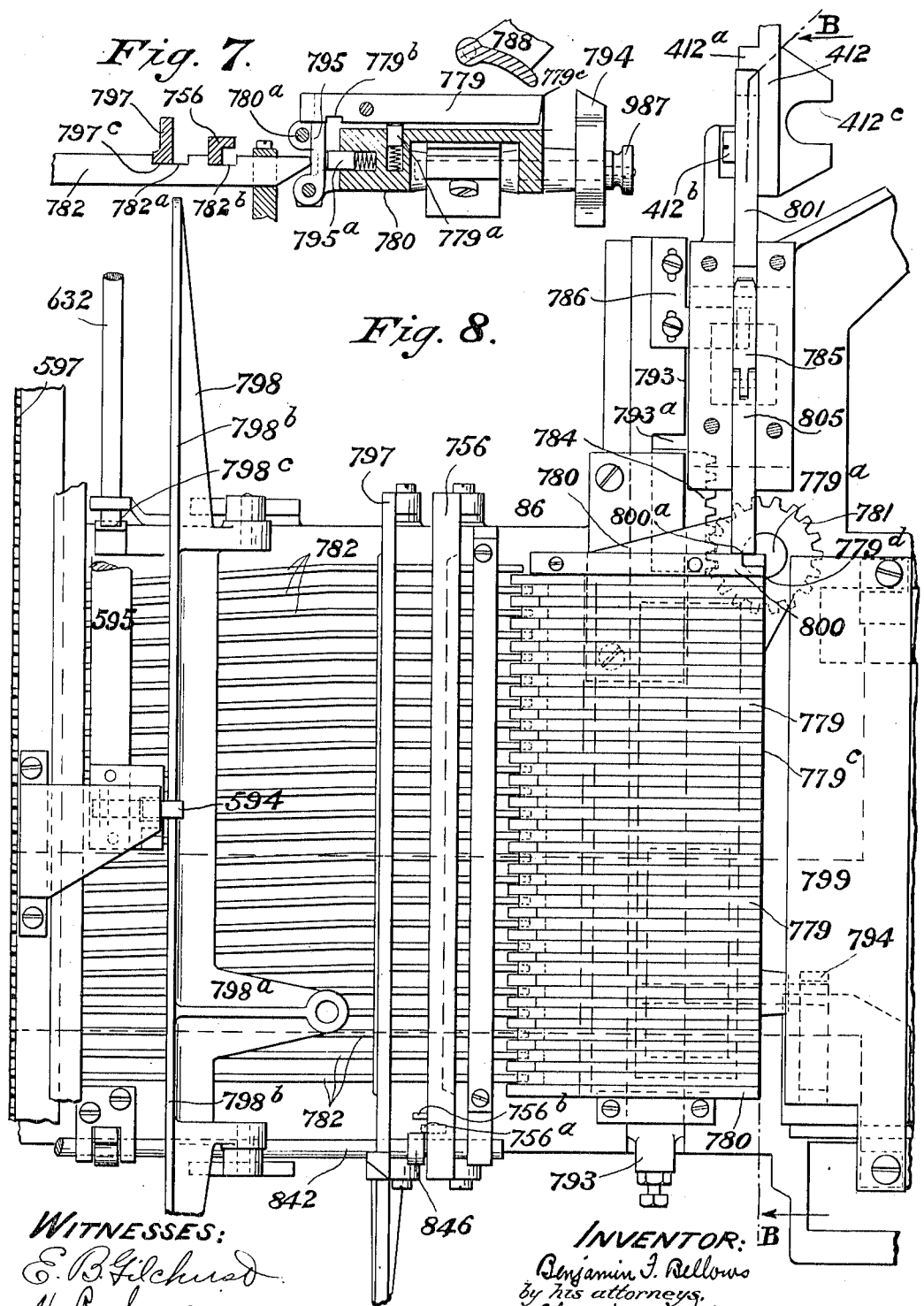

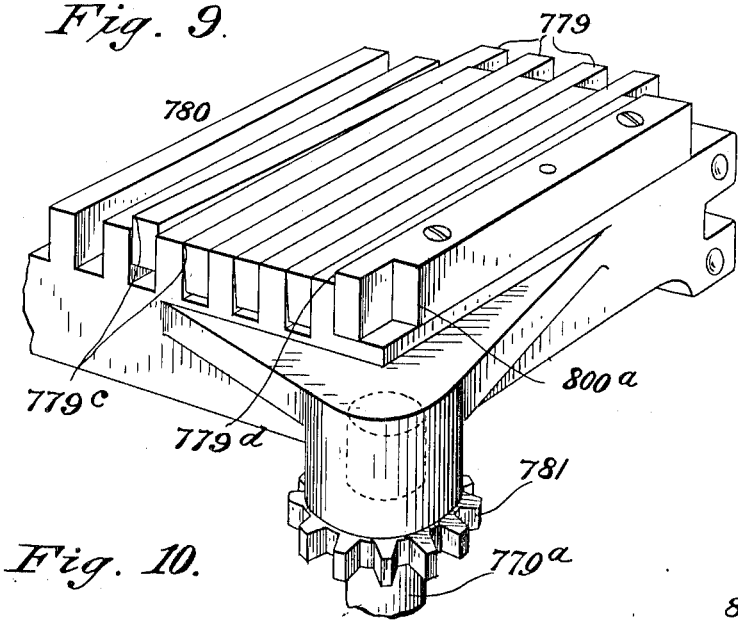
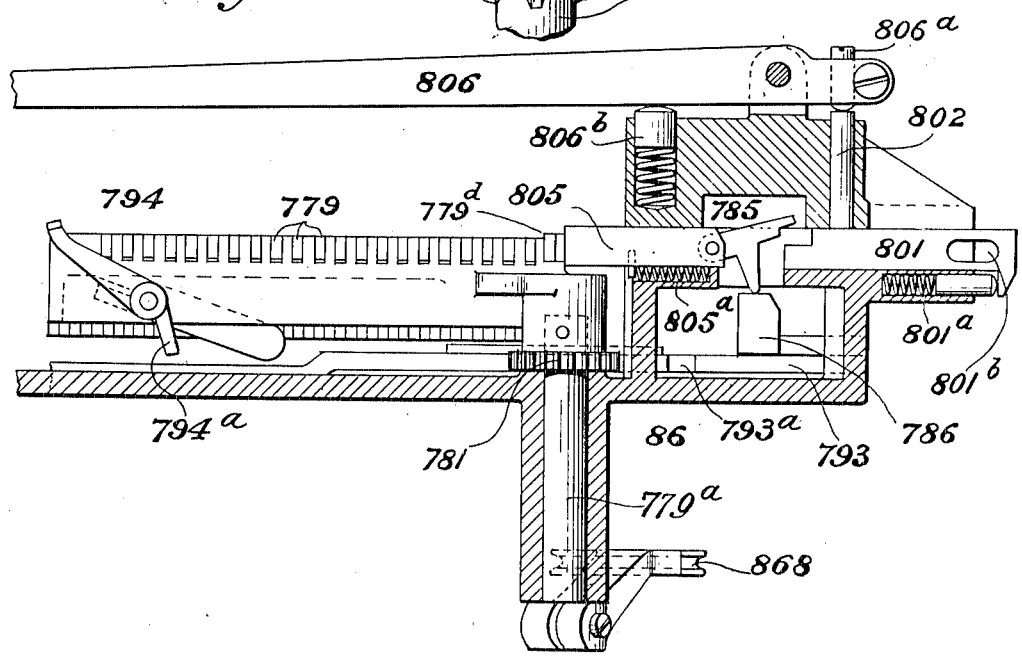

B. F. BELLOWS.
JUSTIFYING MECHANISM.
APPLICATION FILED JUNE 8, 1911.

1,082,006.

Patented Dec. 23, 1913.
20 SHEETS—SHEET 9.

Fig. 11.

WITNESSES:
E. B. Gilchrist
H. R. Sullivan

INVENTOR:
Benjamin F. Bellows
by his attorneys
Thurston & Kivis

B. F. BELLOWS.
JUSTIFYING MECHANISM.
APPLICATION FILED JUNE 8, 1911.

1,082,006.

Patented Dec. 23, 1913.
20 SHEETS—SHEET 10.

Fig. 12.

WITNESSES:
E. B. Gilchrist
H. R. Sullivan

INVENTOR:
Benjamin F. Bellows
by his attorneys
Thurston & Kris

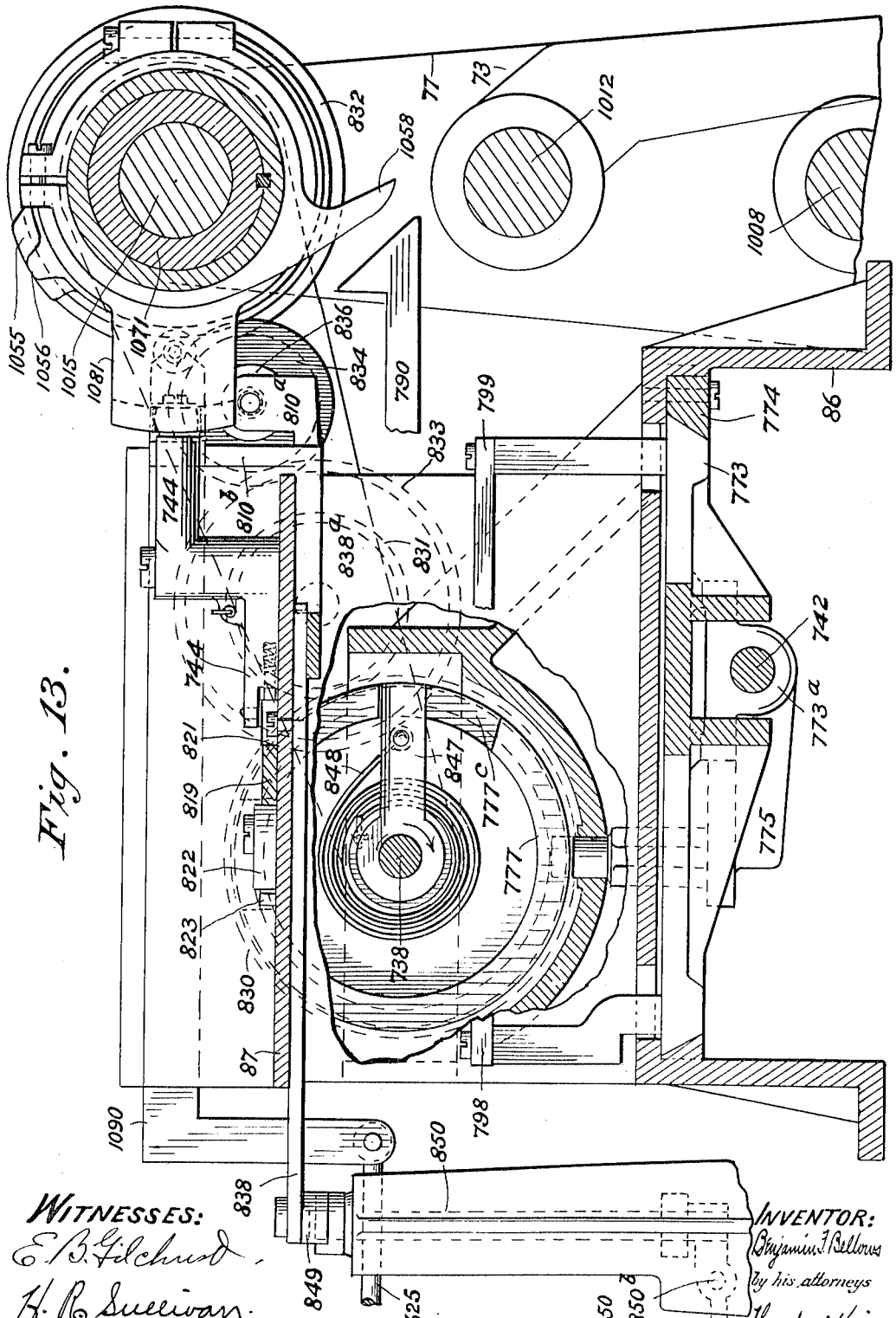

B. F. BELLOWS.
JUSTIFYING MECHANISM.
APPLICATION FILED JUNE 8, 1911.
1,082,006.
Patented Dec. 23, 1913.
20 SHEETS—SHEET 12.
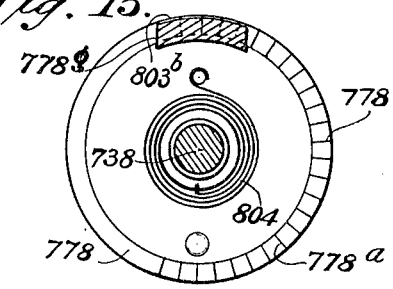
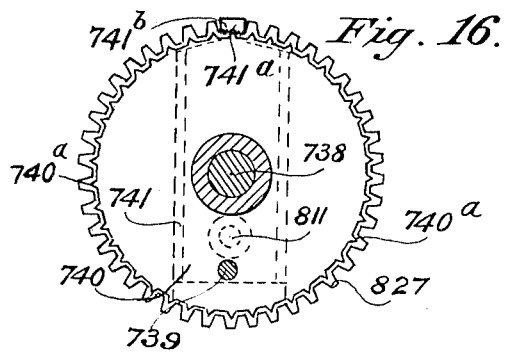
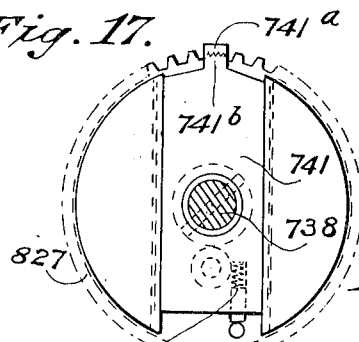
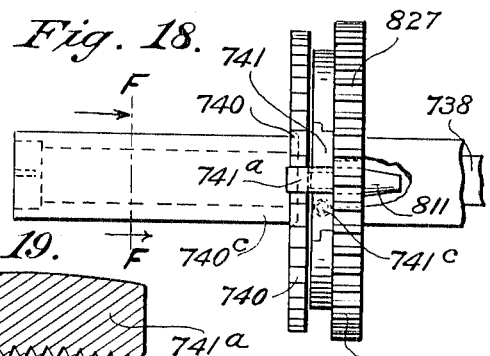
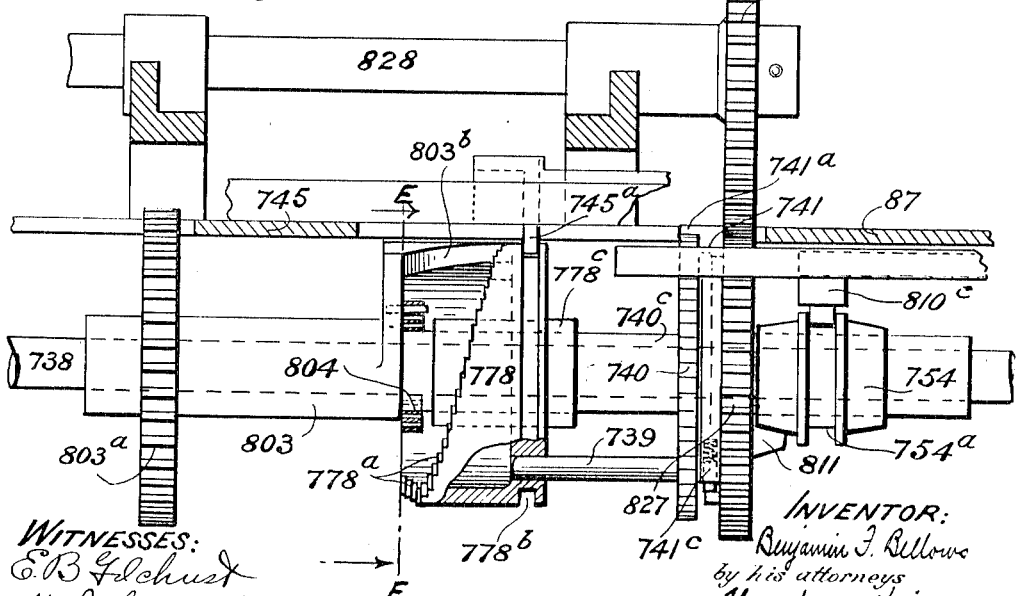

B. F. BELLOWS.
JUSTIFYING MECHANISM.
APPLICATION FILED JUNE 8, 1911.
1,082,006.
Patented Dec. 23, 1913.
20 SHEETS—SHEET 13.
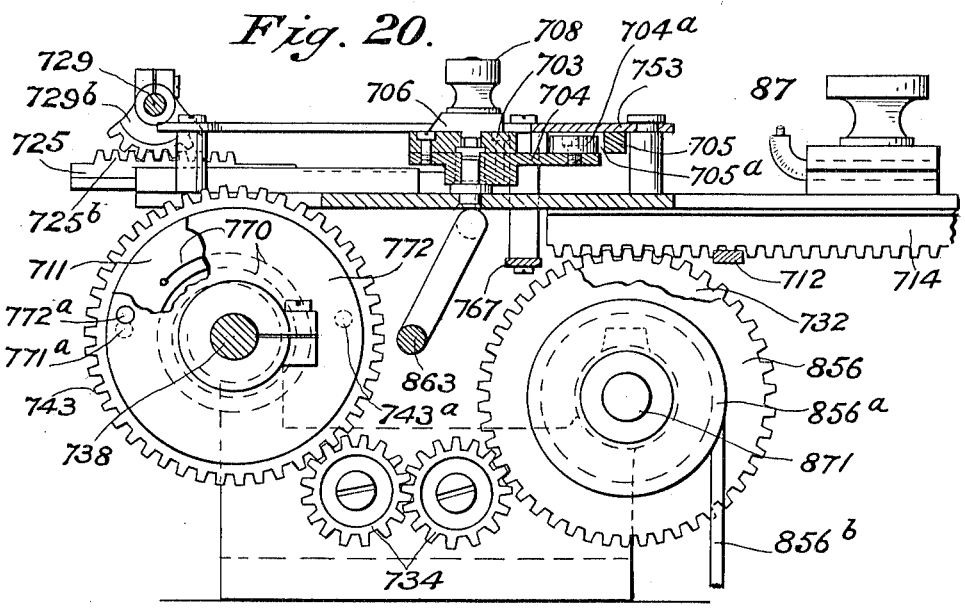
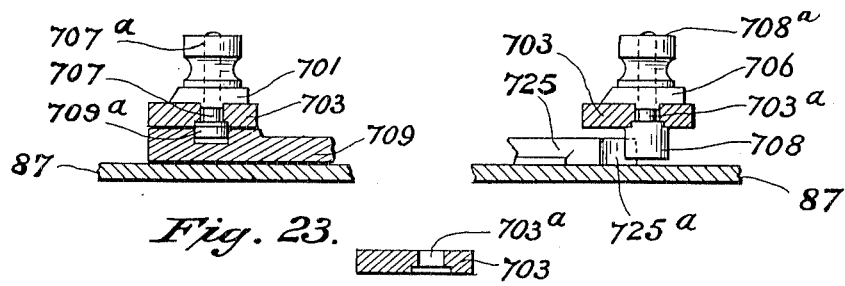
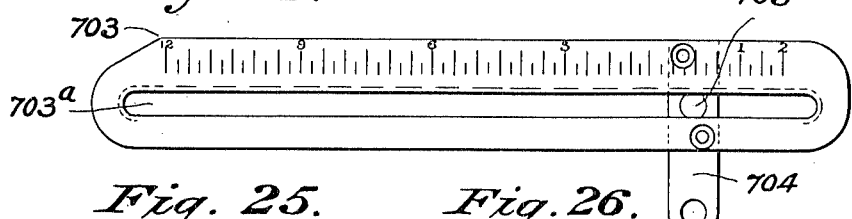
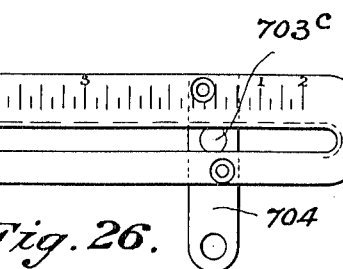
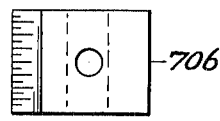
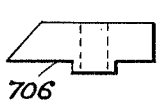
WITNESSES:
E. B. Gilchrist
H. B. Sullivan
INVENTOR:
Benjamin F. Bellows
by his attorneys
Thurston & Kwis B. F. BELLOWS.
JUSTIFYING MECHANISM.
APPLICATION FILED JUNE 8, 1911.
1,082,006.
Patented Dec. 23, 1913.
20 SHEETS—SHEET 14.
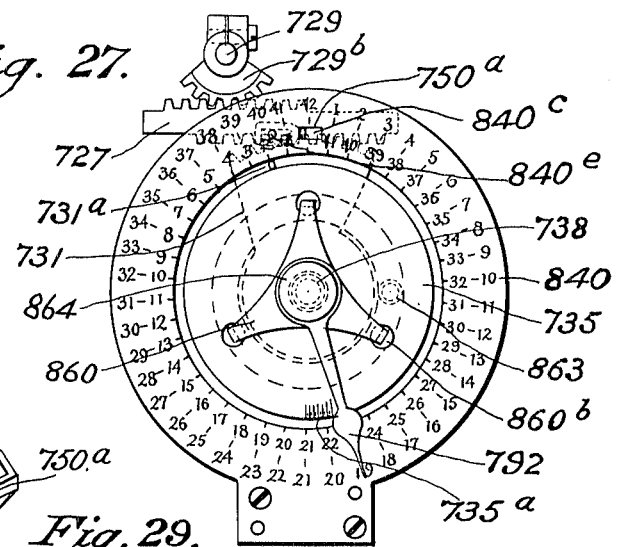
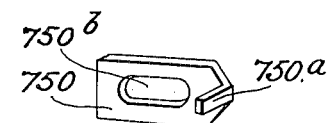
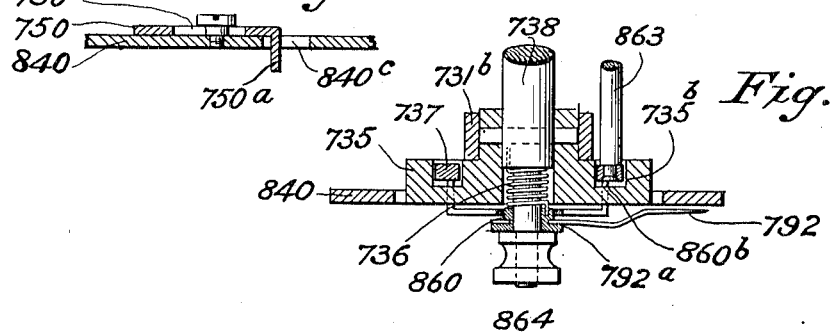
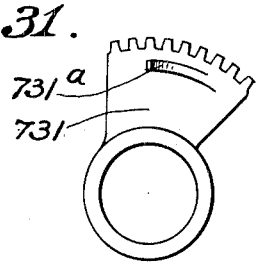
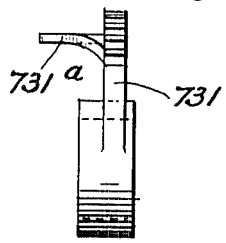
WITNESSES:
INVENTOR:
Benjamin F. Bellows
by his attorneys
Thurston & Kivis

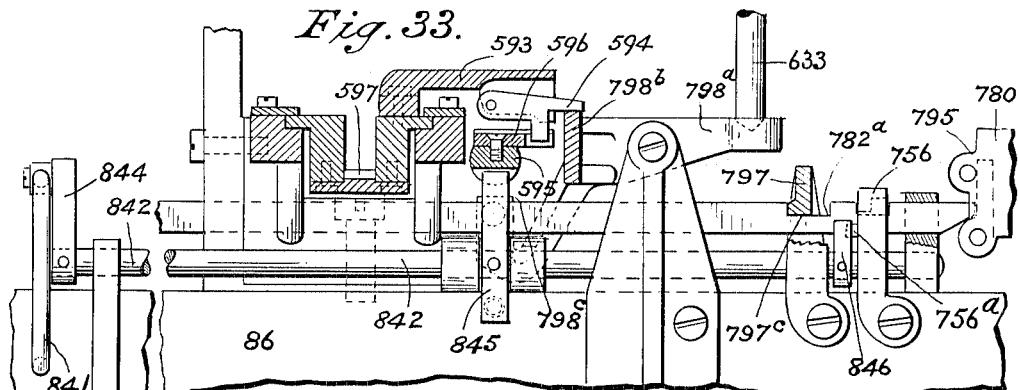

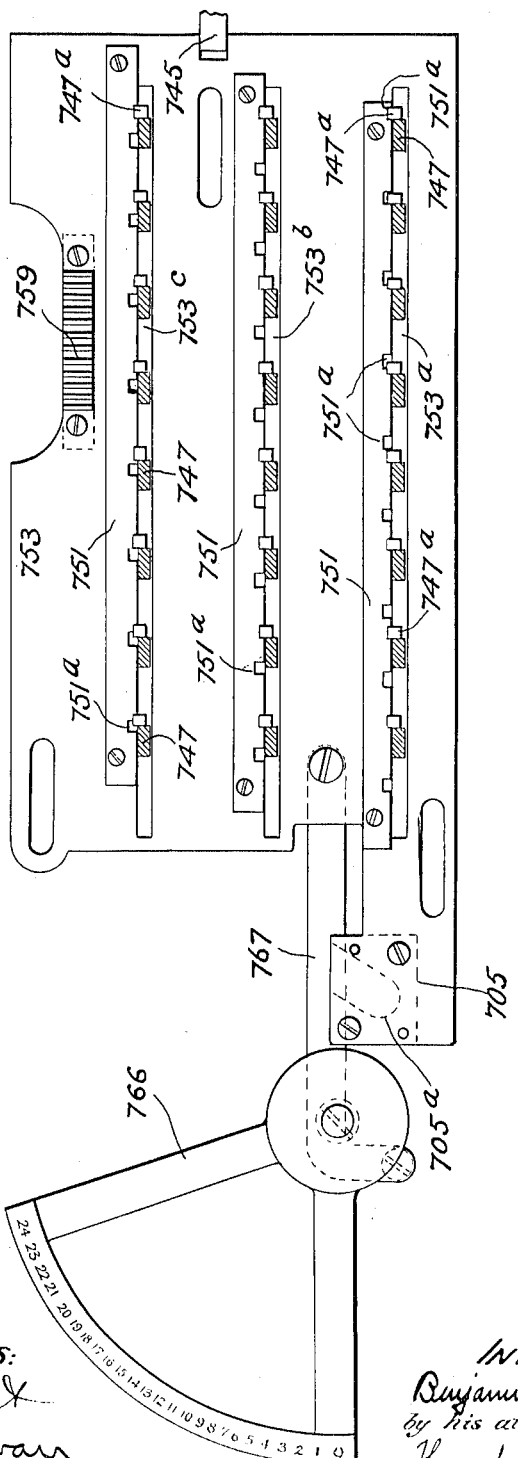

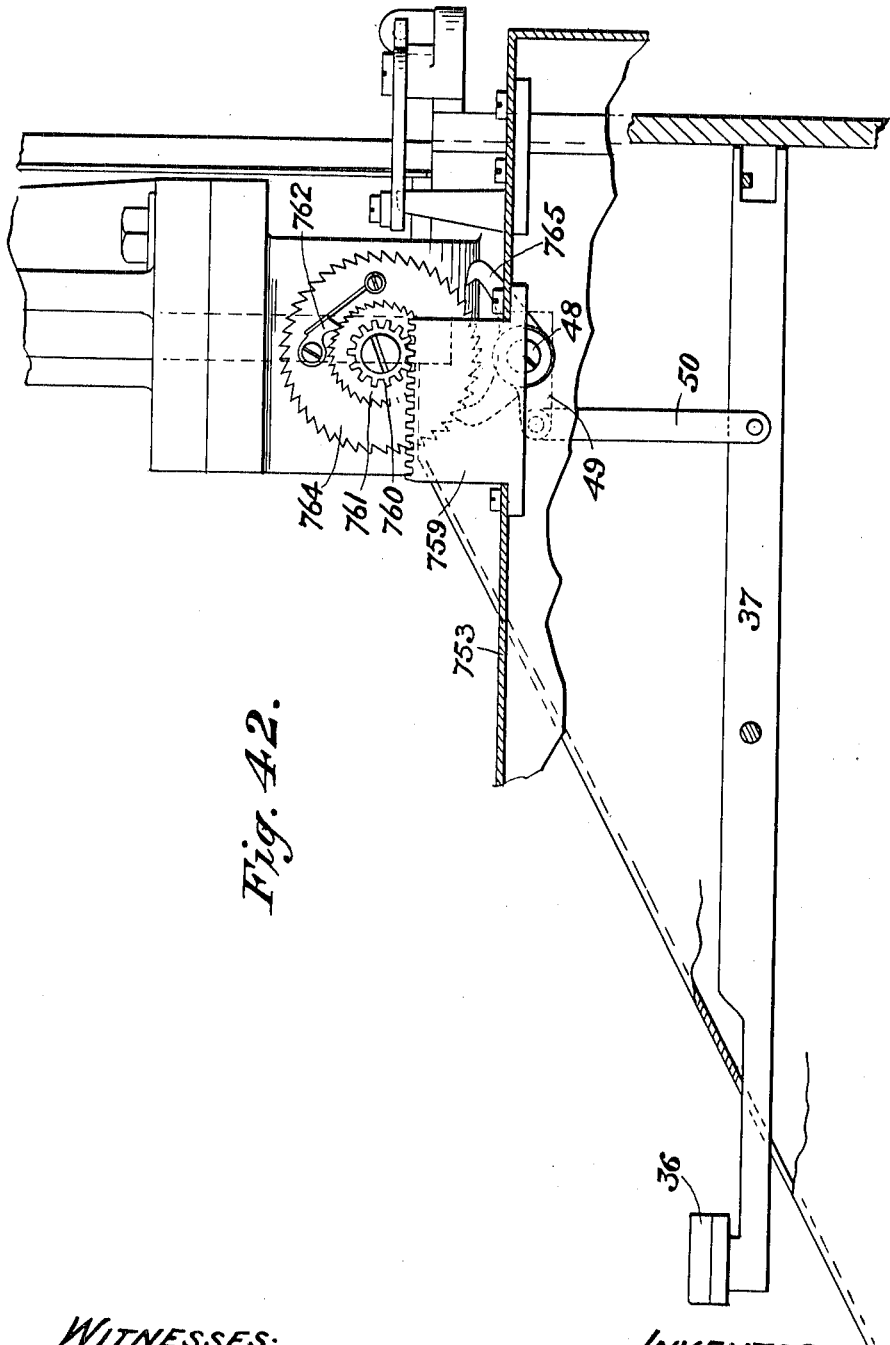

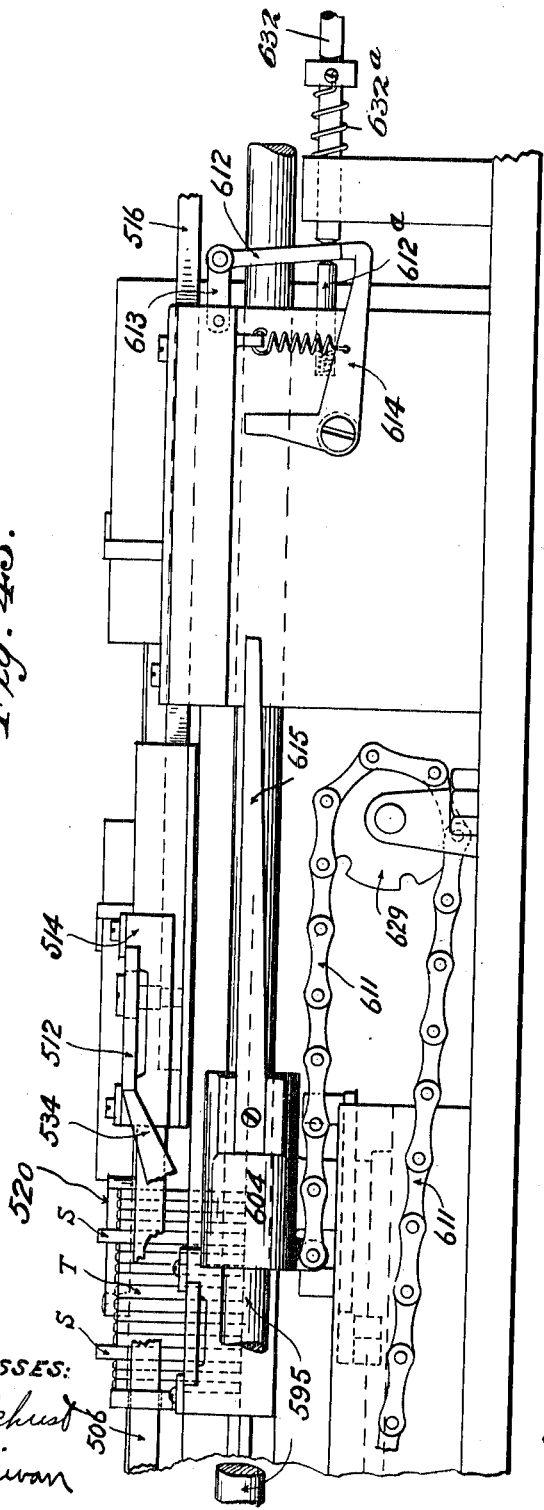

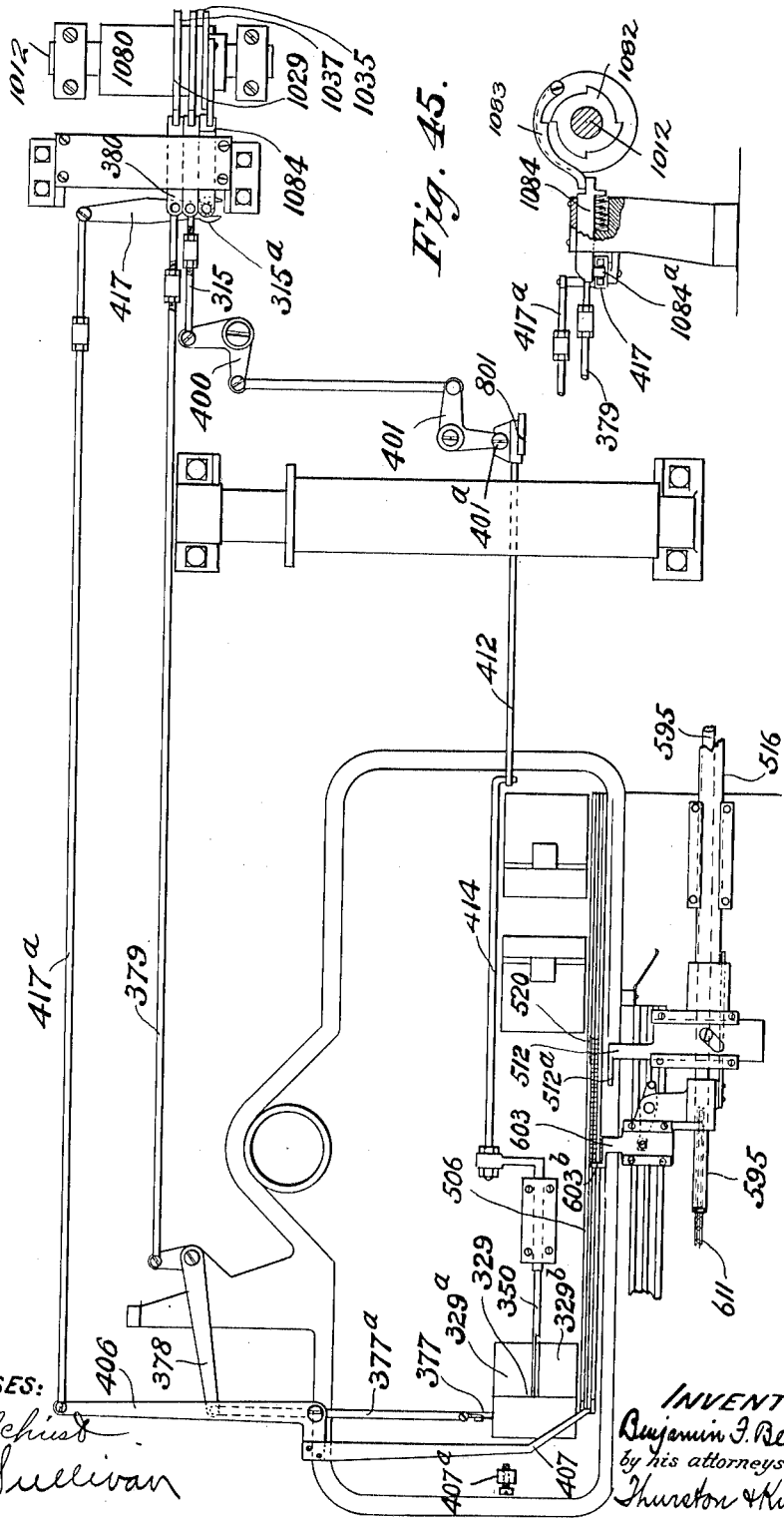

B. F. BELLOWS.
JUSTIFYING MECHANISM.
APPLICATION FILED JUNE 8, 1911.

1,082,006.

Patented Dec. 23, 1913.
20 SHEETS—SHEET 20.

WITNESSES:
E. B. Gilchrist
H. B. Sullivan

INVENTOR:
Benjamin F. Bellows
by his attorneys,
Thurston & Kwis

UNITED STATES PATENT OFFICE.

BENJAMIN F. BELLOWS, OF CLEVELAND, OHIO, ASSIGNOR TO ELECTRIC COMPOSITOR COMPANY, OF NEW YORK, N. Y., A CORPORATION OF NEW JERSEY.

JUSTIFYING MECHANISM.

1,082,006.   Specification of Letters Patent.   Patented Dec. 23, 1913.

Original application filed July 19, 1909, Serial No. 508,497. Divided and this application filed June 8, 1911. Serial No. 631,875.

*To all whom it may concern:*

Be it known that I, BENJAMIN F. BELLOWS, a citizen of the United States, residing at Cleveland, in the county of Cuyahoga and State of Ohio, have invented a certain new and useful Improvement in Justifying Mechanism, of which the following is a full, clear, and exact description.

This application is a division of my application, Serial No. 508,497, filed July 19, 1909, for a machine for making, setting and justifying type; and is intended to cover the improvements in justifying mechanism which are shown and described in said prior application. The said improvements in justifying mechanism are shown herein in the specific form in which they were organized for rendering them particularly applicable for use as a part of said type making and setting machine. It should be understood, however, that the said improvements in justifying mechanism, as defined by many of the appended claims, are capable of embodiment in a great variety of specific forms, and are applicable for use to justify lines of foundry type which are set mechanically or by hand, or to justify lines of matrices.

The object of the invention is to provide suitable means by which lines of type or matrices may be accurately justified either as units or in any required number of sections.

The justifying mechanism in its broad aspect includes a pivoted divisor frame or lever having one arm of invariable length which is to be suitably connected with some space determining mechanism (which is exemplified herein by the tongue of a mold in which justifying spacers may be cast) and another arm whose length may be varied in accordance with the number of justifying spacers required; and a contact bar which may be put into a position, dependent upon the line shortage to be filled by justifying spacers, and in such relation to the long arm of the divisor frame that such arm will, when the lever is swung from its normal position, engage with said contact bar and be stopped thereby.

The invention includes, in addition to the broad combination of parts above set forth, a great many features of invention for rendering the above combination of practical value, and for enlarging its capacity to such extent that lines may be justified as units, or in any required number of sections of any length.

For a more exact definition of the invention and the several improvements of which it is composed, reference may be had to the appended claims.

The drawings show in detail the particular embodiment of the invention which, as stated, was organized with special reference to its use in and as part of a type making and setting machine; and the drawings also show clearly enough for our present purpose many parts, which are particularly parts of said type setting machine, but which nevertheless contribute to the practical operation of this particular embodiment of the justifying mechanism in the particular machine referred to.

Figure 2:
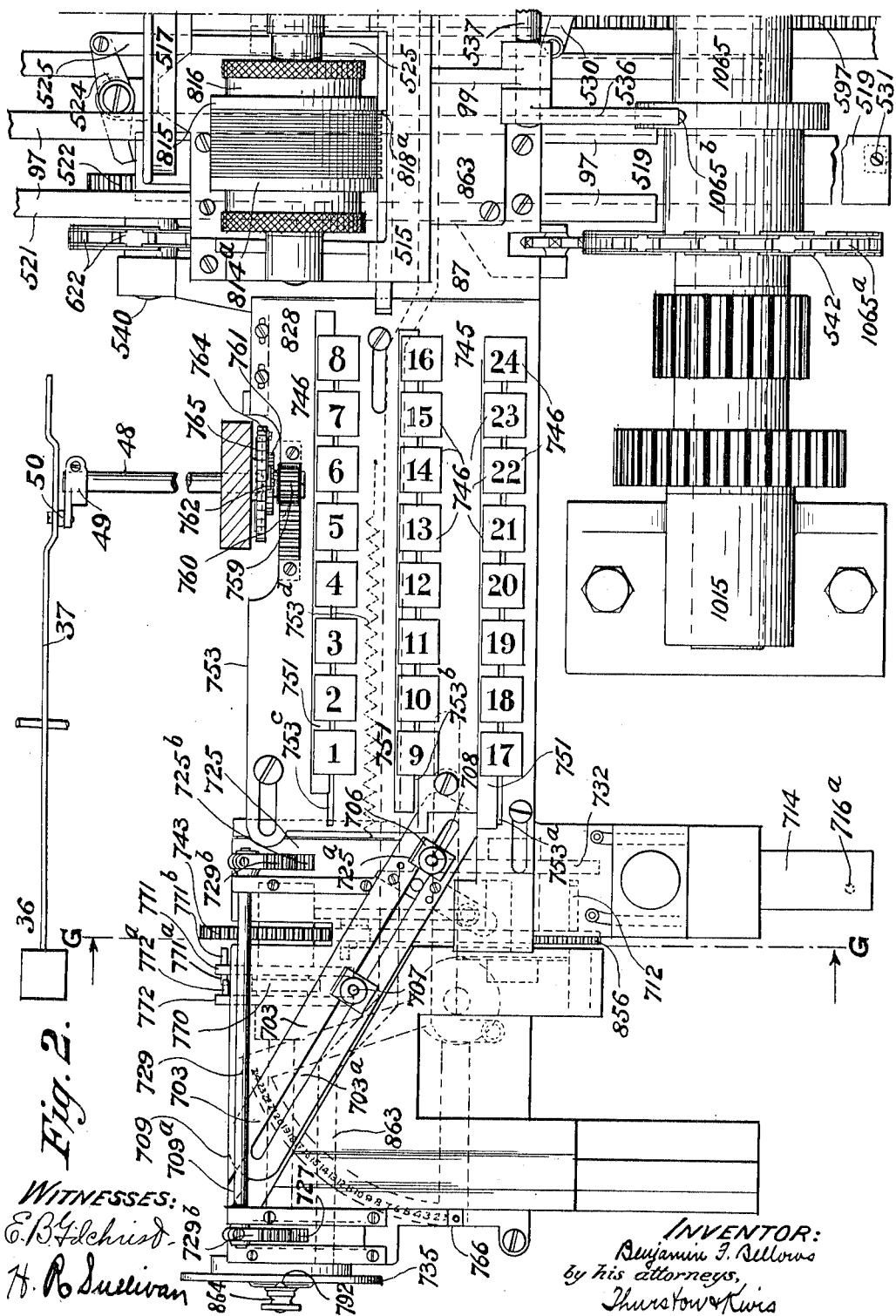
Figure 3:
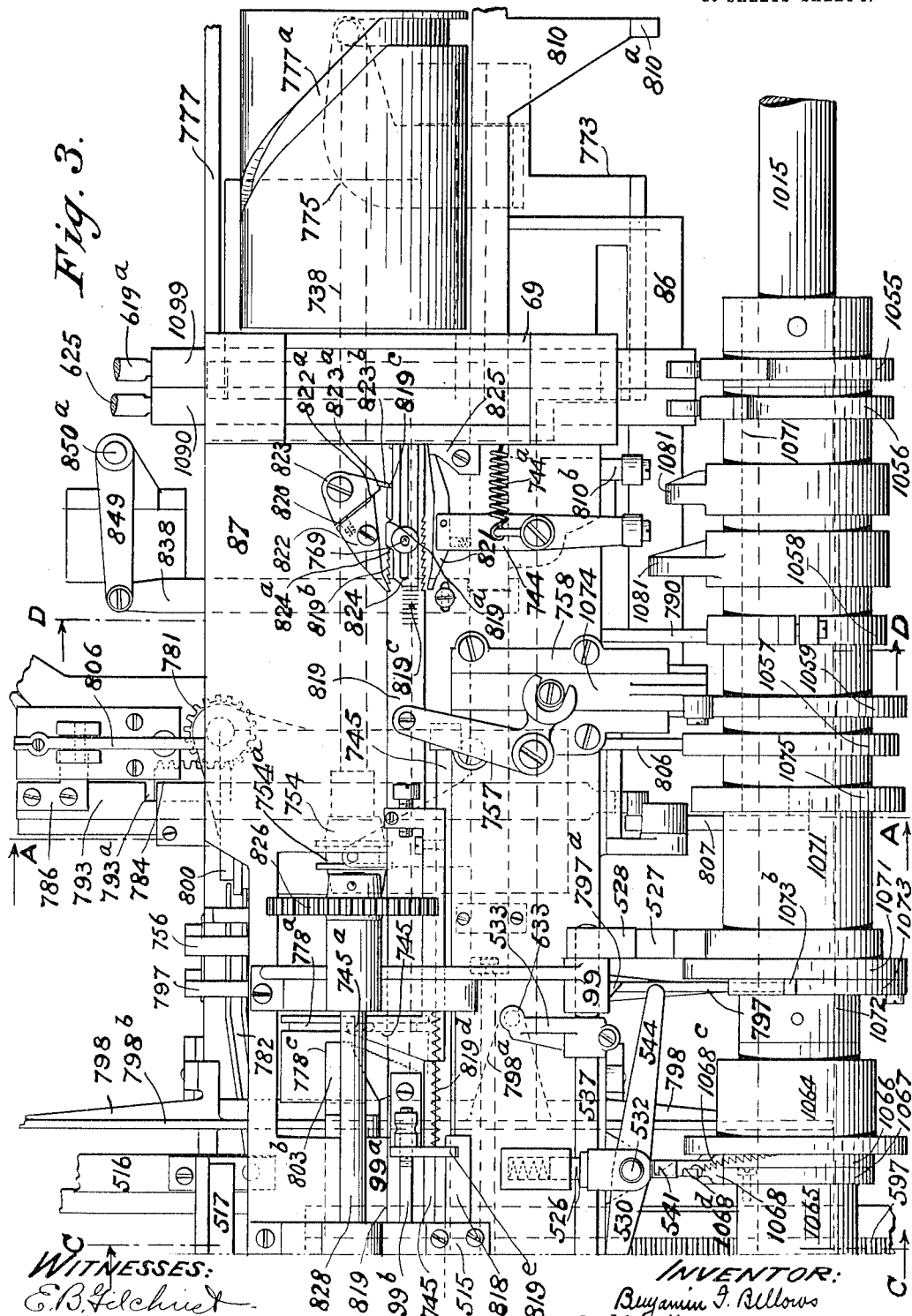
Figure 4:
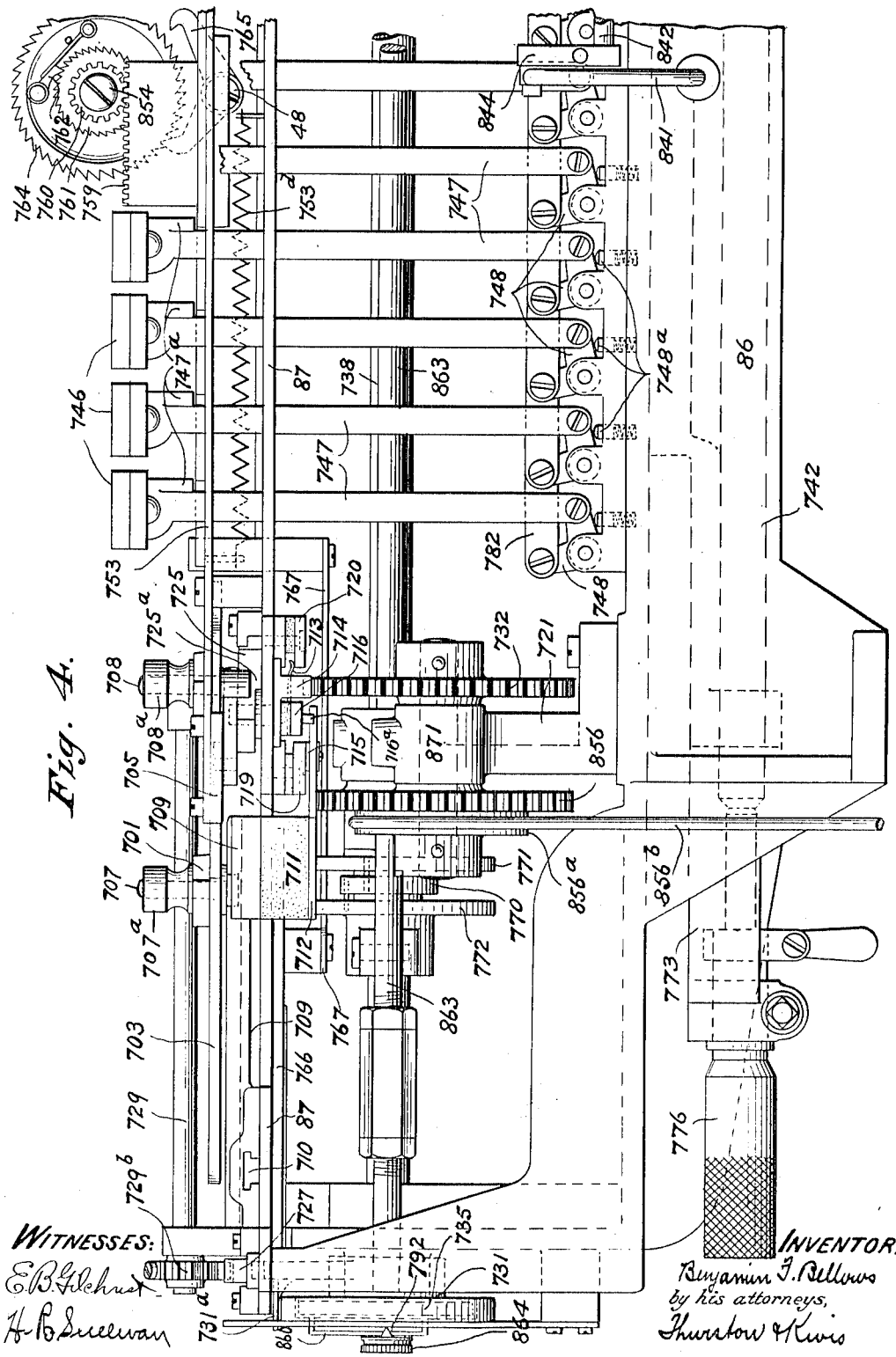
Figure 46:
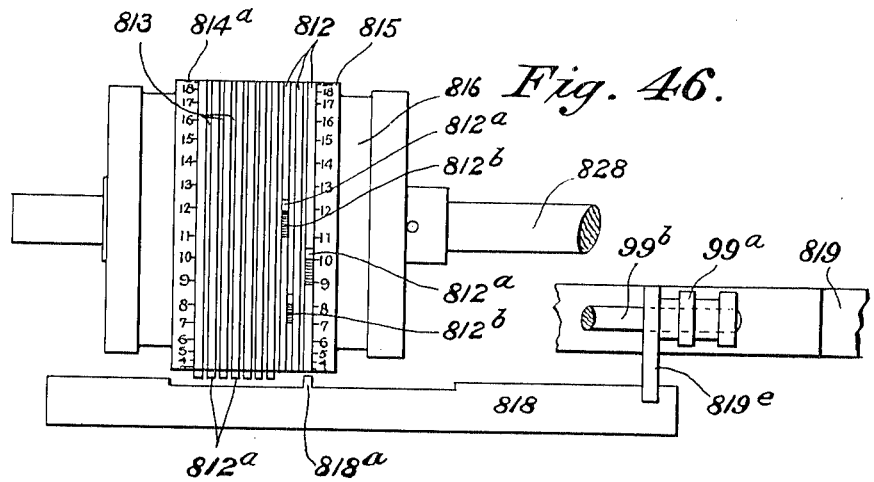
Figure 47:
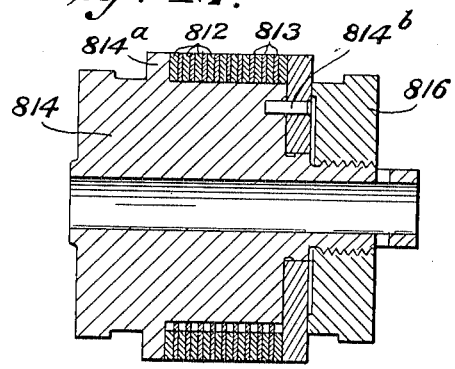
Figure 48:
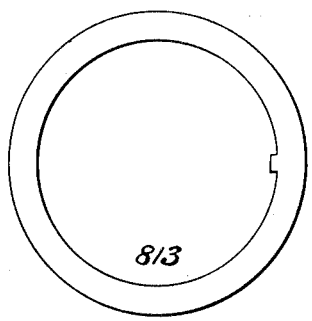
Figure 49:
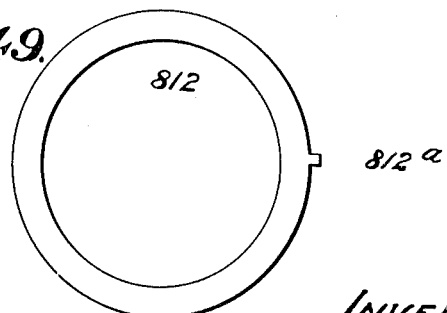

Figure 1 is a side elevation of the justifying mechanism embodying said invention. Figs. 2 and 3, taken together when the right end of Fig. 2 is put against the left end of Fig. 3 constitute a plan view of the justifying mechanism. Fig. 4 is a full sized side elevation of the front end of the justifying mechanism. Fig. 5 is a plan view of the rear end of the justifying mechanism below a plate 87 which is called the justifier deck. Fig. 6 is a sectional elevation in the plane indicated by line A—A on Fig. 3, looking in the direction of the arrow, but with the justifier frame and the parts carried thereby shown unsectioned. Fig. 7 is a vertical sectional view through the justifier frame and some parts adjacent to it. Fig. 8 is a plan view showing the justifier frame, the contact bar, the release rods and other adjacent mechanism concerned in the justification. Fig. 9 is a perspective view of the part of the divisor frame adjacent to its pivotal support. Fig. 10 is a sectional view in the plane indicated by line B—B on Fig. 8. Fig. 11 is a front elevation of the justifying mechanism. Fig. 12 is a vertical sectional view in the plane of line C—C on Fig. 3, looking in the direction of the arrow. Fig. 13 is a vertical sectional view in the plane of D—D on Fig. 3, some parts being broken away to better show the other parts. Fig. 14 is a sectional front elevation of the stepped cam 778 and the mechanism immediately associated therewith. Fig. 15 is a sectional view in the plane of line E—E on Fig. 14. Fig. 16 is a sectional view on line F—F on Fig. 18. Fig. 17 is an end view of the gear 827 and mechanism carried thereby viewed from the left side thereof—the supporting shaft being sectioned. Fig. 18 is a plan view of the spine wheel 740, gear 827 and the means for connecting them. Fig. 19 is a magnified section of the flange 741ª and the adjacent edge of the spine wheel 740. Fig. 20 is a vertical section on the line G—G on Fig. 2,—this view showing the space gage swung into a position parallel the path of the traveler. Fig. 21 is a sectional view through the space gage and other parts indicated. Fig. 22 is a sectional view through the space gage and adjacent parts near the right end of said gage. Fig. 23 is a sectional view of the space gage. Fig. 24 is a plan view of the space gage. Fig. 25 is a plan view of one of the space gage plates. Fig. 26 is an end view thereof. Fig. 27 is a front end view of the line indicator mechanism. Fig. 28 is a perspective view of the stop slide 750. Fig. 29 is a radial section through one side of the indicator wheel 840. Fig. 30 is a central sectional plan view of the line indicator mechanism shown in Fig. 27. Fig. 31 is a detached front elevation of the indicator member 731. Fig. 32 is a side view thereof. Fig. 33 is a side elevation partly sectioned of some of the mechanism shown in Fig. 5,—the section being in the plane of line P—P on Fig. 5. Fig. 34 is a plan view of the right end of the detent rod. Fig. 35 is a rear view of the right end of the detent rod. Fig. 36 is a section across shaft 1012 showing the clutch mechanism for connecting said shaft and the sleeve 1080. Fig. 37 is a section across shaft 1015 showing the clutch mechanism for connecting said shaft and the sleeve 1065. Fig. 38 is a section across shaft 1015 showing the clutch mechanism for connecting said shaft and sleeve 1071. Fig. 39 is an elevation of the member 797. Fig. 40 is an elevation of the rear end of the member 798. Fig. 41 is a plan view of the traveler and some associated mechanism,—the justifier keys being shown in section. Fig. 42 is an elevation showing the mechanism for controlling the movement of the traveler. Fig. 43 is a front elevation of the detent and push mechanisms and associated parts near the left end thereof showing the detent in engagement with a partly completed assembled and unjustified line of type. Fig. 44 is a plan view of the mechanism having to do with casting justifying spacers of the required thickness, and their introduction into an unjustified line. Fig. 45 is an end view partly sectioned of shaft 1012 and some associated parts. Fig. 46 is a full sized side view of the collars 812 and the parts associated with them. Fig. 47 is a longitudinal section of the parts shown in Fig. 46. Fig. 48 is a detached view of the spacing disks 813. Fig. 49 is a detached view of one of the collars 812.

The two principal elements of the justifying mechanism referred to in the introduction, namely, the divisor frame 780 and the contact bar 799 are shown in various figures in the drawing, but perhaps their relation to each other appears most clearly in Figs. 5 and 8. The divisor frame, the construction of which can be readily understood by reference to Figs. 9 and 10 and some other figures, is provided with a vertical shaft 779ª by means of which it is pivoted on a vertical axis to a suitably fixed part of the machine. The short arm of this frame appears as clearly as anywhere else in Fig. 8, and its invariable length as there shown is the distance from the vertical edge 800ª to the axis of the frame. It is the extent of movement of this vertical edge from its normal position which, through suitable intermediate mechanism, determines the width of the justifying spaces required.

The contact bar 799 is located near the rear end of the machine and behind the divisor frame; and its vertical front face is parallel with the rear vertical edge of the long arm of the divisor frame when the latter is in its normal position. This contact bar is movable toward and away from the long arm of the divisor frame by suitable mechanism. At the time when the divisor frame is swung from its normal position, the distance between said contact bar and said divisor frame is equal to the line shortage which is to be filled up with justifying spaces. Broadly speaking, it does not matter in what manner this contact bar is moved to this position, but the machine which is illustrated in the drawing includes mechanism by and through which this contact bar is properly positioned for each line of type whatever may be the shortage or however many justifying spaces may be required. This mechanism in the form shown will presently be described. The function of this contact bar, after it has been moved to said position, is to arrest the rearward movement of the long arm of the divisor frame; and this movement is arrested by the engagement with said contact bar of one of many divisors 779 carried by the long arm of said divisor frame. It is through the projection upward of one or another of these divisors that the operative length of the long arm of this lever or divisor frame is varied; and the purpose of varying the length of this arm is to render it as many times as long as the short arm thereof as there are temporary spaces in the line to be replaced by justifying spacers. These divisors are small levers 779 lying and movable in grooves in the top of the divisor frame. (See Figs. 7, 8, 9 and 10.) The rear ends of these divisors are normally in a horizontal plane below the contact bar 799. (See Fig. 6.) Each of these divisors has associated with it a spring plunger 779ª, supported by the divisor frame, and exerting on said divisor a force tending to swing the rear end thereof upward and into the plane of the contact bar. (See Fig. 7). Each divisor is associated with a trigger 795 which is pivoted to the divisor frame and engages beneath the front end of the divisor so as to normally prevent the rear end thereof from swinging upward, said trigger being normally held by a spring plunger 795ª against a rod stop 780ª carried by said divisor frame. This trigger is adjacent to a notch 779ᵇ in the lower face of the divisor, and is capable of being moved beneath this notch. When it is so moved the associated divisor will be swung by its spring plunger 779ª so as to carry its rear end up into the plane of the contact bar. When, thereafter the divisor frame is swung on its axis so as to carry its long arm toward the contact bar, the rear right hand corner of the raised divisor will engage with the vertical surface which constitutes the front face of said contact bar. By front face of the contact bar is meant the face which is the left face of said bar, as shown in Fig. 8. These rear right hand corners indicated by 779ᶜ in Fig. 9, are located distances from the axis of the divisor frame which are multiples of the length of the short arm of said divisor frame. In designing the justifying mechanism in accordance with this invention, one must, first, determine how many divisions of the line shortage the mechanism will be organized to make. That being determined, an equal number of divisors will be provided. In the exemplification of the invention shown in the drawing twenty-four of these divisors are provided, all movable, as above described, upon the divisor frame, except that divisor which is nearest the axis of the divisor frame. That particular divisor, indicated by 779ᵈ, (Fig. 8) is immovable upon the divisor frame, and its rear end is always in the plane of the contact bar. The operative rear right hand corners of all of these divisors are, as before stated, various distances from the axis of the divisor frame, which distances are multiples of the length of the short arm of said divisor frame. That is to say, the operative rear right hand corner of the third divisor will, when the divisor is raised, be three times as far from the axis of the divisor frame as the length of the short arm thereof. The operative rear right hand corner of the fourth divisor will be four times as far from the axis of the divisor frame as the length of the short arm of said frame, and so on. The short arm of the divisor frame is indicated in Fig. 8 by the line running from the axis of the divisor frame to the vertical corner or angle marked 800ª (see also Fig. 9) said arm being at right angles to the long arm of said divisor frame. The movement of this corner or spur 800ª from its normal position, in the embodiment of the invention shown, is intended to be transmitted through certain mechanism to be described to the mold tongue 350 of the space mold 329 as stated, (see Fig. 44) because the machine for which this specific form of justifying mechanism is organized, is designed to cast the justifying spaces one by one, and put them into the line in substitution for the temporary spaces therein. But those familiar with this art will understand that it is not essential that a space mold tongue shall be the thing positioned by the said movement of the short arm of the said divisor frame lever. It may position any kind of a space selecting or indicating device. For various reasons, however, which will appear as the description proceeds, the space mold tongue, as the machine is organized, does not bear directly against this operative spur. Instead, there is a slide 805 which is under the influence of a spring 805ª which holds it against the spur 800ª on the divisor frame. (See Figs. 8 and 10.) There is also another slide 801 alined with the slide 805; and there is a pawl 785 pivoted to slide 805 and adapted to swing down behind the right end of the slide 801, or to be raised to an inoperative position above it, as the case may be. The slide 801 is under the influence of a spring 801ª tending to push it to the right as shown in Fig. 10, (but which is left to one standing in front of the machine.) This end of this slide 801 is adapted for engagement by a shoulder 412ª on the rear end of the yoke 412, and has a sliding connection with said yoke through a screw 412ᵇ which screws into yoke 412 and goes through a slot 801ᵇ in said slide. The yoke is connected by means of a link 414 with a slide 413 to which the right end of the space mold tongue 350 is connected. (See Fig. 44). This yoke has an operative connection with the bell crank lever 401, one arm of which lever is connected by a link 401ᵇ with one arm of the bell crank 400, while the other arm of said bell crank is connected by the link 315 with the spring actuated slide 315ª which engages with the cam 1035 on the space mold cam sleeve 1080. The connection between the bell crank 401 and the yoke end is, by means of a roller bearing stud 401ª carried by one arm of the bell crank and entering a notch 412ᶜ in said yoke end. This apparently complex train of mechanism intermediate of the short arm of the divisor frame and the space determining device is constructed in substantially the manner described in order that an intermediate part thereof, namely, the slide 801, may be locked in its adjusted position without interfering with the necessary ejecting movements of the space mold tongue, (if that form of space determining device is employed) and without preventing the return to their normal positions, while justifying spaces are being put into one line, of the divisor frame, and its divisors and the contact bar and all of the mechanism through which it is positioned. It might be here stated that the space mold 329 may be of conventional construction, comprising two side blocks 329$^a$, 329$^b$, between which the mold tongue 350 is slidably fitted, and a mold slide 377 which serves at times as the side of the mold cell which opposes the mold tongue. This slide is connected by link 377$^a$ with a bell crank lever 378, the other arm of which is connected by link 379 with a slide 380,—said slide being under the influence of a spring similar to the spring shown in Fig. 45, which holds it against a cam 1029 on the space mold cam sleeve 1080.

After the divisor frame has swung in the manner stated, until stopped by the contact bar 799, for the purpose of dividing the shortage by the number of spaces required, and has thereby permitted slide 801 to be moved into its adjusted position, a clamping pin 802 which is movable vertically through an overhanging part of the justifier frame, is moved down upon the top of the slide 801 with force enough to clamp it immovable by means of a lever 806 pivoted to a fixture. (See Figs. 6 and 10). One arm of this lever has an adjustable screw 806$^a$ adapted to bear upon the clamping pin 802 and push it down,—said lever being moved in the clamping direction by a spring plunger 806$^b$. Its other arm extends to a position which it may engage and move in the releasing direction by a cam 1057 on the justifier cam sleeve 1071. (See Fig. 3).

It is the engagement of a shoulder 412$^a$ on the yoke 412 with the left end of slide 801 which determines the outward movement of the space mold tongue; but said slide 801 does not prevent said yoke and the parts connected with it from moving freely in the opposite direction, namely, that which moves the mold tongue in the space ejecting direction. It is the spring actuated slide 315$^a$ which moves this yoke back against slide 801, and thereby positions the space mold tongue; and it is the cam 1035 with which slide 315$^a$ engages which moves the yoke in the direction which, through the intermediate mechanism described, moves the space mold tongue in the ejecting direction, without causing any movement of slide 801.

The divisor frame 780 is held in the normal position, as shown in Fig. 8, by the following mechanism, to wit: (see Figs. 3, 5, 6, 8, 9 and 10). On the divisor frame shaft 780$^a$ is fixed a pinion 781 with which a rack 784 engages. This rack normally lies in a recess 793$^a$ in a slide 793, said recess being slightly longer than the rack. This slide is under the influence of a spring 793$^b$, but it is restrained from movement by the engagement of one end of said slide with a bell crank lever 807, the other arm of which lever engages the cam 1075 secured to the justifier cam sleeve 1071. The cam prevents the swinging of the lever; the lever prevents the movement of the slide; the slide prevents the movement of the rack; and the rack prevents the turning of the divisor frame. The swinging of the divisor frame when released from restraint, is produced by a weight 867$^a$ suspended from a cord 867 running over a suitable guide sheave 867$^b$ and connected with a segment 868 secured to the lower end of the shaft of the divisor frame.

Leaving for the present the divisor frame and associated parts, attention is now directed to the contact bar 799, and the mechanism by which it is properly positioned for coöperation with the divisor frame. It will be understood by those familiar with this art that all machines for setting type and matrices (such for example as the type setting machine which this justifying mechanism is particularly organized for use with) have a key-board; and that an operator, by manipulating the keys, causes the assemblage, one by one, of type and temporary spacers in a suitable canal or raceway; and that such machine contains a packer by which the growing type line is moved along this type canal, after each addition to the line, a distance equal to the width of such addition; and that a detent lies in or projects into the canal in engagement with the first type in the line so that, as the line is successively moved by the packer, the detent will be given an aggregate movement equal to the total length of the line. All of this mechanism, and, in fact, all of the mechanism necessary to make a complete type making and setting machine is shown in the application from which this application is divided. Because the justifying mechanism which forms the subject matter of this application is organized with especial reference for use as a part of the type setting machine, some of the terminology employed herein in describing the operation of the justifying mechanism assumes a knowledge on the part of the reader of the general construction of type setting machines. For example, the detent 603 and the detent rod 595 with which it is connected, and, consequently, the contact bar will, when the mechanism is a part of the type setting machine, receive a movement synchronously with the addition of each type to the line; and certain other mechanism will have a movement whenever a temporary space is added to the line by the operation of the space key. So far as the present invention is concerned, however, it will operate and perform its functions if the line be assembled by hand and then put into the type canal and moved therein so as to move the detent a distance equal to the length of the line; and provided also a space key or some equivalent thereof be manipulated as many times as there are temporary spacers in the line.

In Figs. 43 and 44 a partially completed line of type T is shown in a type canal 506 with temporary spacers S between words. These spacers are all of equal known width and are preferably higher than the type. The rear end of this type line,—that is to say, the right end as shown in Fig. 43, is engaging with a spring pawl 520 which projects into said canal. The fingers 603$^b$ of a detent 603 extend into the canal and are engaged by the first (left) type in the line, and this detent has been moved to the left from its normal position a distance equal to the length of the line. This detent 603 is connected with a detent rod 595 which is mounted so as to be movable endwise in a path parallel with the canal. So far as the justifying mechanism alone is concerned this detent might be fixed to the detent rod, although, as a matter of fact, it is a slide supported in guideways in a frame 604 fixed to the detent rod, and is movable backward and forward so that the detent fingers may project into the type canal, or be withdrawn forwardly therefrom. This precise construction is described and the purpose therefor set forth in the application from which this application is divided. The detent rod has attached to it a chain 611 which goes around an idler sprocket 629 and thence around another idler sprocket 630 and has a weight 631 suspended from its end so that the detent rod is under the influence of force constantly tending to move the detent to the right, and, of course, resisting its movement to the left. This detent, however, is not alone provided to hold the type upright. It has another function, namely, that of measuring the length of the line in order to thereby set a part of the justifying mechanism in accordance with the length of the line. In order that it may do this, a detent rack 597 is provided, which rack is in the form of a slide which is movable right and left in suitable guideways in a frame member. It should be noted that this rack slide 597 is by the side of and parallel with the detent rod. (See Figs. 5, 8). At the right end of this rack slide a bracket arm 593 is secured. The detent rod has secured to its right end a coupling block 596 containing a notch. A pawl 594 pivoted to the bracket arm 593 is adapted to enter this notch and thereby connect the rack slide 597 with the detent rod 595. The parts are so connected while the detent and its rod are being pushed to the left by the growing line.

The detent rod has associated with it a peculiar form of ratchet clutch which, as the line is being assembled, prevents the weight from moving the rod to the right. (See Fig. 43). This clutch is nothing more than a plate 612 having a hole through it through which the detent rod passes. This clutch is connected at its upper end by a link 613 with a part of the fixed framework of the machine. Its lower end lies between a spring plunger 612$^a$ tending to push it to the right and an endwise movable rod 632. Normally the spring plunger pushes this clutch plate a little to the right so that it will bite on the detent rod and prevent it from moving to the right, but will not interfere with its free movement to the left. The lower end of this clutch plate normally rests upon the upturned toe on the end of the horizontal arm of a spring actuated bell crank lever 614. The other arm of this lever, which is substantially vertical, lies in the path of a finger 615 fast to the detent frame 604.

Now, when a line has been completed, the operator depresses the appropriate justifier key 747 which, through mechanism to be described, releases the automatic clutch for connecting the justifier cam sleeve 1071 with its shaft 1015. The clutch immediately acts and the sleeve begins to rotate. An arm 527 secured to the sleeve strikes an arm 528 attached to a rock shaft 537. (See Figs. 2 and 3). An arm 533 on this rock shaft operating through a vertical rod or link 633 (see Fig. 12) rocks the rocking frame 798 (see Fig. 8) and this, among other things, causes the beveled surface 798$^c$ to move the rod 632 endwise, (see Figs. 8 and 40) and this pushes the clutch plate 612 to the left, off of the upturned finger on the horizontal arm of the bell crank 614, which bell crank is thereupon moved upward by its spring, carrying the fingers up behind the clutch plate and holding it temporarily in position to which it has been moved. This frees the detent rod from restraint, and immediately the weight attached to the detent rod causes the said rod and detent to be moved to the right, thereby solidly compacting the assembled line between the detent and the retaining pawl. The position of the detent is therefore at this time such as corresponds with the length of the line; and the detent rack slide, which is connected with the detent rod, is correspondingly positioned. This rocking frame 798, which is shown very clearly in Figs. 3, 5 and 8 is pivoted at its end to a fixed frame member,—the axis of the pivots being parallel with the detent rod. This frame 798 has one horizontal arm 798$^a$ with which the lower end of rod 633 engages. Along the front edge of this frame is a rib 798$^b$ on which rests the pawl 594 which connects the detent rod with the detent rack. When, therefore, this frame is rocked as stated, this rib will be lifted and this will lift the pawl 594, and thereby the detent rod and detent rack will be disconnected. When later the detent is withdrawn from the type canal and the detent weight is moving the detent rod back to its initial position, a beveled surface of the coupling block 596 carried by the detent rod strikes the pawl 594 carried by the detent rack and lifts it, and then said pawl drops into the notch in the coupling block. The further movement of the detent to the right now drags the detent rack with it and both come to rest in their initial positions.

It has been found necessary in the particular embodiment of the invention which is shown to temporarily disconnect the detent rack and the detent rod in order that the detent rack may remain in the position to which it was moved, determined by the length of the unjustified line, while the justifying mechanism operates to determine the spacers required, without requiring any delay in the operation of the machine in moving the unjustified line over to the position where the justifying spacers are substituted for the temporary spacers. As the detent rod reaches its initial position the finger 615 carried by the detent frame strikes the upturned arm of the bell crank lever 614 and swings it so as to release the clutch plate 612. This plate is now swung by the plunger 612ª to the position shown in Fig. 43—the endwise pressure on the rod 632 having in the meantime been relieved so as to permit this action. The justifying mechanism shown is organized so that it can justify lines of any length up to seven inches; and so that, if a seven inch line is required, four inches of that line may be made up of justifying spaces. It is only under most extraordinary circumstances that such a line will ever be required, but, as stated, the machine is organized to produce it. This contact bar referred to has a maximum movement away from the plane in which the rear ends of the divisors lie of four inches. When the line to be justified is more than four inches long the contact bar at the beginning of the line occupies this extreme position, and remains in that position until the unassembled part of the line is four inches long—that is to say until there remains to be formed with type and justifying spaces four inches of the proposed line. When the justified line to be formed is four inches long or less, the contact bar at the beginning of that line is brought to a position, by means which will be presently explained, in which its distance from the vertical plane in which the rear ends of the divisors lie is exactly equal to the length of said proposed line. When the line to be formed is four inches long or less, or when there remains to be assembled of a longer line four inches thereof, this contact bar will thereafter move toward the divisors as the assembling of the line proceeds, in step by step movements which are in the aggregate equal to the length of the line so assembled exclusive of the temporary spacers therein. It follows therefore that at all times during the composition of a line, if the line shortage is four inches or less, the distance between the contact bar and the vertical plane in which the rear ends of all of the divisors lie is equal to the line shortage. There will now be described the mechanism by which this contact bar is so moved in accordance with the length of a line. (See Figs. 3, 5, 6, 13, etc.) This contact bar is fixed to a slide 773, which may move forward and backward in a suitable guideway. This slide has adjustably secured to it an arm 775 on which is a vertical roller entering a groove 777ª in the cam 777. The specific connection is shown in Figs. 1 and 13. The arm 775 is fixed to a rod 742 which is movably mounted in brackets 773ª on slide 773. The forward movement of this rod upon the slide is limited by the engagement of the front end of the rod with the rear end of a screw 776 which screws into the front end of slide 773. A spring 742ª acts to hold the rod against said screw. The cam 777 may be turned through about one-half of a revolution without having any effect in moving endwise the slide 773 because said groove extends around about one-half of said cam in a plane at right angles to the axis thereof. The remainder of said groove is, however, a cam groove of such pitch that as the cam rotates the slide 773 and the contact bar 799 carried thereby will be moved toward the divisor frame, and this movement, which is produced through addition of type (not temporary spaces) to the growing line in the type canal, will be equal to the aggregate width of the type which by their introduction into said type canal does, through the mechanism now to be described, cause the turning of said cam. This cam is connected with the rotatable justifier shaft 738 by means which normally compel them to rotate together, but which permits a slight independent rotation of the shaft in case there is some obstruction to the movement of the cam or slide or contact bar. Particularly, is this connection provided so as to prevent injury to the machine in case the operator oversets the line. Should he overset his line after the contact bar has reached the limit of this movement toward the divisors, the shaft 738 can be turned without producing any corresponding movement of the cam or contact bar. This connection (see Fig. 13) between the shaft and the cam consists of an arm 847 fixed to the shaft and projecting into a notch or recess 777ᶜ in cam 777 in which said arm has a limited movement; and helical spring 848 fixed at one end to said arm and at the other end to the cam. This spring is of such character and strength that as the shaft is being turned in the direction of the arrow in Fig. 13 its movement will be transmitted through said spring to the cam and cause a like turning movement thereof. But if the cam cannot be turned, the shaft will be turned alone winding up said spring.

Rotatably mounted upon the justifier shaft 738 is a sleeve 803 carrying a gear 803ᵃ and a finger 803ᵇ. (See Fig. 14). The detent rack 597 engages with this gear and therefore, since the rack, as has been previously explained, is moved whenever a type or temporary space is added to the line, this gear and the parts with which it is rigidly connected will likewise turn, whenever the length of the line is increased, a distance substantially proportionate to the increase. Rotatably mounted upon the shaft 738, adjacent to the sleeve 803, is a sleeve 740ᶜ to which is rigidly fixed a spine wheel 740. Upon this sleeve the hub 778ᶜ of a stepped cam 778 is mounted in such way that it may move endwise upon said sleeve. A pin 739 fixed to the spine wheel 740 and lying parallel with the shaft 738 passes through a hole in the web of said stepped cam. It therefore follows that said stepped cam and spine wheel must rotate together, although the stepped cam may move lengthwise of the shaft independently of the spine wheel without breaking this driving connection. The finger 803ᵇ is adapted to engage with one or the other of the steps 778ᵃ on said stepped cam, and thereby turn the stepped cam, whereby, through the described mechanism, the spine wheel 740 is likewise turned. A volute spring 804 surrounds this sleeve 740ᶜ and is connected at one end to it and at the other end to the sleeve 803, and its function is to turn the stepped cam relative to the sleeve 803 to its initial position relative to the finger 803ᵇ. That is to say, the initial position of the stepped cam relative to the said finger is such that said finger lies between the first step thereon and a shoulder 778ᵍ thereon; as a line is being set up, the finger will move away from the shoulder 778ᵍ, as will be explained,—wherefore the action of spring 804 is to turn the cam 778 in the same direction in which the finger 803ᵇ turns it; but this spring induced movement of the cam brings shoulder 778ᵍ against said finger. This movement of the cam 778 cannot take place, however, while a line is being assembled.

Adjacent to the spine wheel 740 a gear 827 is fixed to shaft 738. On the face of this gear adjacent to the spine wheel is a radial guideway in which is mounted a radially movable clamp slide 741 having a clamping finger 741ᵃ which overhangs the spine wheel, and has on its inner periphery a plurality of serrations 741ᵇ adapted for engagement with the spines or teeth 740ᵃ on said spine wheel. So long as this clamp slide is held so that this engagement takes place, the turning of the spine wheel produces a like turning of the shaft 738 and consequently a like turning of the cam 777 and a corresponding movement of the slide 773 and the contact bar 799 fixed thereto; provided, as before explained, the unset position of the line is four inches or less long. It produces the turning of the cam 777 irrespective of the unset length of the line.

The distance between spines on the wheel 740 is equal to the arc through which said spine wheel will be turned by increasing by one "em" the length of the line of type being formed. The distance between serrations on the clamping finger 741ᵃ corresponds to the arc through which said wheel will be turned by each "point" of increase in the length of said line. It is through this clamp that the cam 778 is allowed to return to its starting position, and there be operatively connected with the justifier shaft whatever may be the length of the lines being composed; and it is through this clamp that the justifier shaft may be connected with the mechanism controlling the length of the line, even though the line is to be so many ems and so many points long,—as will be explained.

The purpose of the stepped cam 778 is to eliminate from the registered measurement of the line by the contact bar, the width of the temporary spacers put into the line. These are always of invariable width, and the steps 778ᵃ on the stepped cam are of such length around the shaft as to correspond with the width of the temporary spacers. Means are provided by which whenever a temporary spacer is added to the line this stepped eliminator cam will be moved away from the finger 803ᵇ a distance equal to the height of one of the steps on said cam, and therefore to bring into engaging relation with said finger the next step on said cam. When after this, the line's length is increased by the addition of a temporary space thereto, the sleeve 803 will turn independently of the stepped cam until the finger 803ᵇ comes again against that newly presented step 778ᵃ which has come into its path. It is evident, therefore, that through the described mechanism the cam 777 will be turned as a line is being assembled a distance proportionate to the length of that line exclusive of temporary spacers. The mechanism by which this stepped cam is moved longitudinally when temporary spacers are added to the line will now be described. (See Figs. 2, 3, 14 and 41.)

In the stepped cam is an annular groove 778ᵇ into which projects an arm 745ᵃ secured to a sliding bar 745, which bar is connected with the traveler 753. This traveler is a guided slide supported on the framework. In this traveler (see Fig. 41) are three slots 753ᵃ, 753ᵇ and 753ᶜ which extend forward and backward and parallel with the path in which this traveler moves. Three rows of justifier keys 746 are provided. Their shanks or stems 747 extend down through these three slots, and through guide openings through the frame member 87; and their lower ends are respectively connected with the substantially horizontal arms of the bell crank levers 748, (see Fig. 4) said bell crank levers being pivoted to a fixture. A spring plunger 748ᵃ acting on the horizontal arm of each lever 748 holds the justifier keys up in their normal positions. Secured to the traveler is a rack 759 which is engaged by a pinion 760 to which pinion the ratchet wheel 761 is made fast. (See Figs. 41 and 42.) Adjacent to this ratchet wheel is an escapement wheel 764 carrying a pawl 762 for engagement with the ratchet 761. These three parts are rotatably mounted on a stud 854 fixed to a fixed frame member. An escapement pallet lever 765 is provided for engagement with the escapement wheel 764 said lever being attached to a rock shaft 48. This rock shaft has an arm 49 which is connected by a link 50 with the temporary space key lever 37. (See Fig. 42). Whenever the temporary space key is depressed, this shaft will be rocked and thereby the escapement wheel 764 will be permitted to turn one tooth. It is so turned because the traveler is under the influence of a spring 753ᵈ tending to draw it rearward; and when the escapement lever operates as described this spring does so draw the traveler rearward as far as it can go when that movement is accompanied by a turning of the ratchet escapement mechanism the distance of one tooth on the escapement wheel. As a matter of fact this movement is, as the machine is organized, $\frac{1}{32}$nd of an inch, and the steps on the stepped eliminator cam 778 are $\frac{1}{32}$nd of an inch high. Therefore, each of these movements of the traveler produces through the intermediate mechanism described a movement of $\frac{1}{32}$nd of an inch of the stepped cam lengthwise of the justifier shaft, thereby bringing into the path of the finger 803ᵇ that step on the cam which is next to the one which was in the path of that finger. The turning of the sleeve 803 which will follow the introduction into the line of that temporary spacer which was produced as the result of that depression of the temporary space key, will not therefore cause a corresponding turning of the stepped cam. It will merely turn the finger 803ᵇ into contact with said next step on cam 778. In other words, the measurement of that particular temporary space has been eliminated from the measurement of the line, as that measurement will be indicated by the position of the contact bar.

It is evident from the foregoing that whenever any line is short of its required length four inches or less, the distance of the contact bar from the plane of the rear ends of the divisors will be equal to the line shortage. When any line has reached justifiable length, therefore, this shortage represents the space which must be filled in by the justifying spaces. Thus, through the described mechanism, one of the mechanical factors for determining the width of the justifying spaces has been properly positioned, said factor determining the line shortage. This being accomplished the operator now depresses that one of the justifier keys 746 (see Fig. 2) which is numbered to correspond with the number of spacers required in the line. There is in the machine an index 766 which will be presently explained which will tell the operator which of these keys to depress; but in order to eliminate the possibility of his making an error in the selection of the proper key, means are provided by which all of these justifier keys, except the one which should be depressed, are locked against depression. To effect this result each key shank is provided with a finger 747ᵃ, preferably formed integral with the shank and bent slightly out of alinement therewith, and these fingers overhang the notched edge of three bars 751 which are secured to the traveler in proper position. (See Figs. 4 and 41). The notches 751ᵃ are so placed in these bars that when the traveler is in its home position no notch is beneath any finger 747ᵃ. When the traveler moves one step, namely, $\frac{1}{32}$nd of an inch, the notch associated with key No. 1 is moved to a position beneath the finger of that key, and therefore key No. 1 may be depressed. When the traveler has moved two steps or $\frac{2}{32}$nds of an inch, said notch passes partly from beneath the finger of key No. 1 and the notch associated with the finger of key No. 2 passes beneath that finger and so this key may be depressed, and so on through the twenty four possible movements of this traveler.

The depression of a justifying key produces many results, including the setting in motion of certain power producing devices; and therefore these power producing devices and their adjuncts will be now explained.

There are two shafts which have to do with the operation of the justifying mechanism, viz., the justifier cam shaft 1015 (see Figs. 2, 3, 12 and 13) and the space mold cam shaft 1012 (see Figs. 13 and 44). These shafts are to be constantly driven,—the space mold cam shaft turning three times as fast as the justifier cam shaft. On the justifier cam shaft 1015 are two sleeves and the associated clutch mechanism. The sleeve 1071 carries the cams which control the operation of parts of the justifying mechanism. On the end of this sleeve a clutch pawl 1073 is pivoted and has a tooth 1073$^a$ adapted to be engaged by a tooth 1072$^a$ carried by a collar 1072 which is fixed to the shaft 1015. The pawl 1073 is under the influence of a spring 1073$^c$, tending to swing it on its pivot so as to carry the tooth 1073$^a$ into the path of the tooth 1072$^a$. This pawl extends in both directions from its pivot partly around the shaft and has at its ends two outwardly extended fingers 1073$^b$ having operating faces which are diametrically opposed. When the clutch sleeve is at rest one of these fingers is in engagement with the justifier clutch trip 797. When this justifier clutch trip is withdrawn, by means to be hereinafter described, this pawl is released, and swings inward carrying the tooth 1073$^a$ into the path of the tooth 1072$^a$, whereupon the sleeve is compelled to rotate with the shaft and does so rotate until it has made half of a revolution, at which time the other finger 1073$^b$ strikes the justifier trip 797 which has in the meantime swung back to its normal position, and thereby the pawl 1073 is withdrawn from engagement with the other clutch member and the sleeve is positively stopped. The other sleeve upon this shaft 1015 is the push sleeve 1065 which sleeve is concerned in the manner hereinafter described with the movements of the push—that is to say, the member by which a completed line or section of a line is moved along the type canal toward the galley and during the time that the permanent spaces are being substituted for the temporary spaces. The clutch mechanism for connecting this sleeve with the shaft consists of a sleeve 1064 loosely mounted on shaft 1015 and having pivoted to it a double tooth pawl 1068, the two teeth thereof being indicated by 1068$^a$ and 1068$^b$. The two collars 1066 and 1067 are made fast respectively to the shaft 1015 and to the sleeve 1065, and on these two collars the teeth 1066$^a$ and 1067$^a$ are respectively formed. Normally a finger 1068$^d$ on the pawl 1068 is engaged by a trip finger 541, and thereby held in position where it cannot engage with the two teeth 1066$^a$ and 1067$^a$. When released by the movement of this trip finger, the pawl is swung by its spring 1068$^c$ inward, thereby carrying its tooth 1068$^b$ in front of the tooth 1066$^a$, and carrying its tooth 1068$^a$ behind the tooth 1067$^a$. When these teeth come into engagement, the sleeve, of necessity, rotates with the shaft, and it makes one complete rotation, whereupon the finger 1068$^d$ strikes the trip finger 541, and thereby the pawl 1068 is withdrawn and the sleeve 1065 unclutched from the shaft. This peculiar form of clutch, differing as it does from the two clutches previously described, has been adopted because, as will be understood from the description of the function and mode of operation of the push sleeve 1065, it is necessary that this sleeve shall at intervals turn backward relative to the shaft 1015.

On the shaft 1012 a cam carrying sleeve 1080 is rotatably mounted, and clutch mechanism similar to that which has been previously described is provided for connecting and disconnecting this sleeve and shaft automatically at the proper time. For so connecting and disconnecting these parts a pawl 1083 is pivoted to the end of the sleeve and has a projecting finger 1083$^b$. It also has a tooth 1083$^a$ adapted to be engaged by one or the other of the teeth 1082$^a$ formed on a clutch collar 1082 fixed to shaft 1012. Normally the finger 1083$^b$ is engaged by the end of a slide 1084 and held back in an inoperative position; but when this stop slide 1084 is withdrawn the spring 1083$^c$ swings the pawl into a position where one of the teeth 1082$^a$ will engage with the tooth 1083$^a$ on the pawl and so connect the sleeve and shaft that they will rotate together. When the sleeve has made one complete revolution the finger 1083$^b$ will strike the stop slide 1084 which has in the meantime returned to its normal position; thereby the pawl will be positively drawn back to disengage the teeth mentioned, and the sleeve will be positively stopped.

The slide 1084 has at its left end a pin 1084$^a$ which is embraced by a fork on one end of a centrally pivoted lever 417 which lever is connected by a link 417$^a$ with the rear arm 406 of the starting lever 407. This lever, as will be explained, has its front end extended over the type canal close to the tops of the type therein and in the path of the upper ends of the temporary spaces which form a part of the type line in said canal,— these spaces being, as will be explained, a little taller than the type. The line is moved along in the type canal by the push which is caused to so move by a weight 543 acting through intermediate mechanism which will be described. When one of these temporary spaces strikes the starting lever 407, it swings it upon its pivot and through the described mechanism withdraws the slide 1084 from its engagement with the finger 1083$^b$ and thereupon the pawl 1083 acts to connect together sleeve 1080 and shaft 1012. The revolution of this sleeve causes the operation of the mechanism by which a permanent space is cast in the space mold, and said permanent space put into the line in substitution for the temporary space which caused the action of the starting lever. When the starting lever is moved by the contact therewith of one of the temporary spaces its movement is limited by engaging with an adjustable stop 407$^a$; and the stopping of this lever in this manner and position brings the temporary space directly in line with the cross slide 377 of the space mold, so that said slide when the permanent space is in its embrace will push said permanent space directly against said temporary space, pushing it out of the line and taking its place therein.

When the operator depresses any justifier key, he will thereby rock the associated bell crank lever 748. This movement will move endwise the associated divisor trip 782. (See Figs. 4 and 7.) There are twenty-four of these trips which are merely endwise movable bars movable at their rear ends through suitable guideways,—twenty-three of these trips, namely, all except that one which is associated with key No. 1 have their rear ends directly behind and in contact with the associated divisor trigger 795; and when any one of these trips is moved endwise it moves this trigger beneath the notch 779$^b$ in the associated divisor 779, whereupon the divisor flies up at its rear end into operative position, namely, that position in which it will strike the contact bar when the divisor frame is swung. When the divisor frame does swing, its long arm traverses the space between its normal position and the contact bar, which, as stated before, represents the line shortage to be filled out by a known number of justifying spaces. The divisor corresponding with that number of spaces having been relieved, the long arm of the divisor frame or lever, has become as many times longer than the short arm thereof as the number of justifying spaces required. Therefore, the short arm of the divisor frame will move such fractional part of the movement of the long arm as is represented by the number of justifying spaces required. As a matter of fact, the effective movements of both of these arms is represented by the sine of the arcs through which they severally move. The movement of the short arm of the lever will permit, through the mechanism described, such an outward movement of the mold tongue of the space mold that the mold cell thereby produced will be of such width, setwise, as will produce justifying spacers of the proper width, so that when the required number of them are put into the line in substitution for the temporary spaces therein the line will be of exactly the required length.

The depression of any one of the justifier keys also starts in operation certain parts of the power mechanism and does numerous other things as follows: It will be noted (see Figs. 4, 7 and 8) that in the top edge of each divisor trip 782 is a notch 782$^a$. A rocking frame 797 (see Fig. 39) is pivoted to part of the frame member 86, and one edge 797$^c$ thereof, which is parallel to the axis on which the frame is pivoted, enters all of the notches 782$^a$. Therefore the described movement of any of the divisor trips 782 will rock this frame. On this frame is a trip finger 797$^b$ which is engaging with the finger 1073$^b$ of the pawl 1073 which forms the part of the clutch mechanism by which the justifier cam sleeve 1071 is connected with the justifier cam shaft 1015. The rocking of the lever 797 withdraws this finger. Said clutch pawl swings to operative position, and thereby said cam sleeve is connected with the cam shaft and immediately begins to rotate therewith, and continues so to do until it has made one-half of a revolution. When the sleeve has made one-half of a revolution the other finger 1073$^b$ of this pawl will strike this finger 797$^b$ which has in the meantime returned to its first position, and the sleeve 1071 is disconnected from said shaft. One of the first results from the rotation of this cam sleeve is the release from the restraint of the cam 1075, of the bell crank lever 807, which lever, it will be remembered, has, by engaging with the slide 793, held the divisor frame in its normal position. As soon as this bell crank is released from restraint then the weight 867$^a$ attached to cord 867 will, because of the described connection, turn the divisor frame, which movement of the divisor frame will continue until stopped by the engagement of the uplifted divisor, with the contact bar. As the divisor frame turns the pinion 781 fixed to the divisor frame shaft, it will, by its engagement with the rack 784, move said rack and thereby permit the spring 793$^b$ to move the slide 793. This slide carries a bevel ended plate 786 which serves as the means for lifting out of operative position the pawl 785, carried by slide 805. In the said movement of slide 793 which movement is induced by spring 793$^b$ this trip plate 786 is withdrawn from beneath the pawl 785, which thereupon drops to operative position to the right of slide 801.

Before cam 1075 has allowed the divisor frame to move as described, the justifier cam sleeve 1071 has carried arm 527 fixed to it, against the arm 528 on the rock shaft 537, and has rocked it. On the front end of this shaft the push pawl 536 is secured, which normally stands in front of a shoulder 1065$^b$ fixed to the push sleeve 1065, which sleeve is under the influence of a weight 543 tending to turn it. When so released it is so turned, and thereby the push rack 519 and push rod 516 are moved to the left.

The push rod 516 and push rack 519 are movable in paths which are parallel with the detent rod 595; and they are connected by a yoke 517 so that these parts must move in unison. The push rod has a frame 514 fixed to it; and a push slide 512 is movable in said frame backward so as to carry the push fingers 512ª into the type canal behind a line thereon, or forward so as to withdraw said fingers from said type canal. So far as the present invention is concerned this push slide 512 might be moved by hand backward and forward. The principal function of this "push" mechanism is to move the type from the type canal to the embrace of the galley mechanism, and is therefore more particularly a part of the invention which is covered by my application from which this application is divided. In this application is shown and described mechanism for automatically moving the push slide 512 forward and backward. The push rod is moved to the left in that direction which causes it to push the line along the type canal by means of a weight 543 which is attached to a sprocket chain 542. This sprocket chain, following it from the weight up, runs over an idler sprocket 602ª and then over a sprocket 622 attached to a sleeve 521 to which is also attached a gear 522. This sleeve is rotatable upon shaft 540 fixed to suitable brackets. The sprocket next passes over an idler sprocket 602, and is then made fast to and adapted to be wound upon a sprocket wheen 1065ª fixed to a sleeve 1065 which is rotatably mounted upon shaft 1015 and is adapted to be connected thereto by suitable clutch mechanism which will be presently described.

It is obvious that the gear 522 will be turned by the weight-induced action of chain 542 on sprocket wheel 622, and that the push rack and the push rod will be moved to the left. The movement of these parts is, however, normally restrained by the action of the push stop 536 which engages with a lug 1065ᵇ on the sleeve 1065,—this sleeve being that which carries the sprocket 1065ª on which chain 542 is wound. This stop 536 is an arm fixed to a rock shaft 537. The other end of this rock shaft has secured to it a trip arm by which when any justifying line key is depressed, this rock shaft will be rocked and so withdraw stop 536 from in front of the lug 1065ᵇ. The sleeve 1065 will now be turned by the action of the weight. The moving chain 542 will, because of its engagement with sprocket 622 turn sleeve 521 and gear 522 and this gear, by engaging with the push rack 519, will cause the movement of the push rod to the left. This movement will continue intermittently until the push has come to the end of its leftward movement, at which time a downwardly projecting boss 531 on the under side of the right end of the push rack strikes a lever 524. (See Fig. 2). This lever is connected by a link 525 with a lever arm 530, which arm is fixed to a vertical shaft 532 whereby this shaft is rocked. Fixed to this same shaft is a trip finger 541 which engages the clutch pawl 1068 and holds it out of action. (See Figs. 3 and 37). By the rocking of this shaft 532 the trip finger 541 is withdrawn from its engagement with the finger 1068ᵈ of pawl 1068, whereupon said pawl acts to connect the sleeve 1065 with shaft 1015. Said sleeve is then turned one complete revolution before it is disconnected from the shaft, and thereby the chain 542 is wound upon the sprocket wheel 1065ª. When sleeve 1065 has made one revolution it is disconnected from shaft 1015 through the engagement of the pawl finger 1068ᵈ with the trip finger 541; and the lug 1065ᵇ takes its place behind stop 536. During this reverse movement of said chain the sleeve 521 will be turned backward and thereby the push rod and all the parts connected therewith will be moved to the right to their initial or starting positions. The described movement of the "push" mechanism to the left takes place while the push fingers are in the type canal and carries the unjustified line with it until the first of the temporary spacers S which project above the line of type strikes the starting lever 407, thereby rocking the same, (see Fig. 44) and this rocking movement transmitted through the train of mechanism which has been described (see Fig. 44) releases the clutch pawl 1083, whereupon the space mold cam sleeve 1080 is clutched to its shaft 1012. The described movement of the push mechanism and its associated parts occupies some time, during which the sleeve 1071 has continued its rotation, and permitted the described movement of the divisor frame and the slide 801 and 805. When, then, the space mold cam sleeve 1080 begins to turn as stated, the space mold tongue is allowed to move out to the proper position in which it is stopped by the engagement of yoke 412 with slide 801. This same rocking movement of the shaft 537 which has been described also acts through suitable mechanism to disconnect the detent rack from the detent rod so that the initial detent secured to said rod can be pushed ahead of the line as the push mechanism is moving the line, without requiring a synchronous movement of said detent rack.

The mechanism referred to includes a peculiarly shaped lever frame 798 (see Figs. 3, 5, 8, 12 and 40) pivoted to the fixed framework and having an arm 798ª between which and an arm 533 attached to rock shaft 537, a rod 633 is placed. The movement of the arm 533 transmitted through this rod to the arm 798ª rocks the frame 798. There is a rib 798ᵇ on the frame 798, upon which the tail piece of the pawl 594 rests during all of the movements of the rack 597. This pawl is thereby lifted so as to disconnect this rack and rod. Fast to this same frame 798 is a finger 798ᶜ having a beveled surface which bears against the end of the rod 632. As this frame rocks this beveled surface by engaging the end of this rod, moves the rod endwise against the force of a spring 632ᵃ. The other end of this rod abuts the initial detent clutch pawl 612, (see Fig. 43) and pushes it into the position which permits the detent rod to move freely, and also into a position in which said pawl is engaged by the lever 614 and held in the position stated for a suitable length of time. When the detent rod has returned to its starting point, the finger 615 attached to the detent frame 604 by striking one arm of the bell crank lever 614 releases this clutch pawl 612 and allows it to return to its normal position,—the spring 632ᵃ having in the meantime moved rod 632 to the right.

As soon as the space mold cam sleeve 1080 begins to rotate, the cam 1035 thereon recedes and permits the spring induced movement of that train of mechanism which includes the spring actuated plunger 315ᵃ at one end, and the space mold tongue at the other. It will be remembered that a part of that train of mechanism is the yoke 412. This yoke in the movement which follows is drawn against the end of the slide 801, which slide is pushed thereby until it is stopped by engagement with the pawl 785 on the end of the slide 805. The position of the slide 805 has been determined by the distance which the divisor frame has swung. The movement of the slide 801 against the pawl 785 carried by the slide 805 will therefore position the space mold tongue, bringing it to such place that the mold cell thereby opened up is of the proper width for the formation therein of justifying spaces for that particular line. When the slide 801 reaches this position it is there clamped by the clamping pin 802, which is moved in the clamping direction by the spring induced movement of the lever 806, which movement is permitted by the recession of the cam 1057 on sleeve 1071. This takes place when the justifier cam sleeve has made about one-quarter of a revolution. During the remaining one-quarter of the half revolution which this cam sleeve is now making, the bell crank lever 807 is rocked back to the position which it occupied at the beginning of that half revolution. This retracts slide 793, which in the beginning of its movement lifts the pawl 785 out of range of the slide 801. As the slide 793 continues its movement, it picks up the rack 784, and by moving it, causes the backward turning of the gear 781 and the return movement, to its normal position, of the divisor frame.

As the frame returns to its normal position the elevated divisor is pushed down by the action thereon of a rocking bar 788 pivoted to the fixed brackets 791, which bar has fixed to it an operating bar 790 which extends into the path of a cam 1058 fixed to the justifier cam sleeve 1071. As the projecting part of this cam turns past and in contact with the arm 790 this bar is rocked and thereby pushes down any divisor which has been elevated. When an elevated divisor is so pushed down, its trigger 795 automatically flies beneath its tail end, and can so move because the divisor trip 782 has been drawn away from it. When the justifier cam sleeve has made one half a revolution it is stopped as before explained.

The push slide actuated by its weight 543 has, as before stated, pushed the line along until the first temporary space therein has struck and rocked the starting lever 407 of the space mold cam sleeve, which therefore makes one complete revolution and then stops. During this revolution molten metal will be injected into the space mold. The justifying space being formed in the mold by mechanism which is more properly a part of the casting mechanism than the justifying mechanism, the cam 1037 permits the backward movement of the space mold slide 377, and then cam 1035 acting through the described mechanism will move the mold tongue in the direction which pushes out of the mold the permanent space which has just been cast, and pushes the same in front of the mold slide 377. Then the space mold slide is moved forward again, carrying this justifying space forward into the line of type thereby pushing out of the line the justifying space which was engaging lever 407.

It will be remembered that the line was stopped by the engagement of the projecting upper end of the temporary space, so removed from the line, with the starting lever 407 after the lever 407 strikes the stop 407ᵃ. When this particular temporary space is removed from the line, as it is when the newly cast permanent space is substituted for it, this starting lever is allowed to return to its normal position and does so return, and thereby causes the train of mechanism intermediate of it and clutch to return to their starting positions; and this causes the end of the plunger 1084 to come into the path of the finger 1083ᵇ on the clutch pawl 1083, thereby withdrawing it out of operative position and causing the disconnection of the sleeve 1080 and shaft 1012. As soon as the temporary space is removed from the line the push again pushes the line to left along the type canal and continues to so move it until the next temporary space hits the starting lever 407 whereupon the space mold cam sleeve 1080 is again connected with its shaft and all of the movements concerned with the casting of a permanent space and its introduction into the line are repeated. In fact, these movements are repeated until the last temporary space in the line has been superseded by a permanent space. Then the push moves the justified line along the type canal until a boss 531 carried by the push rack strikes the end of a trip lever 524 and rocks it. (See Fig. 2). This lever is pivoted to a fixture, and its opposite end is connected by a link 525 with lever arm 530, which, it will be remembered, is made fast to the rock shaft 532. Attached to this same rock shaft is a trip finger 541 which, when the rock shaft is rocked in the manner stated, releases its engagement with the finger 1068$^d$ of the pawl 1068 and thereby the push sleeve is connected with the shaft 1015. This sleeve is thereupon rotated, and as a result moves the train of mechanism described, including gear 522 whereby the push rack and the push slide and push, return to their starting positions; and this result is attained by the time this sleeve has made one complete revolution, at which time the finger 1068$^d$ again engages with the trip 541, whereby said push sleeve is disconnected from the shaft. Attached to the rock shaft 532 is also another arm 544 which arm, when the rock shaft is rocked as stated, strikes the beveled surface 797$^a$ on the rocking frame 797, and thereby withdraws the finger 797$^b$ from its engagement with the pawl finger 1073$^b$, whereupon the justifier cam sleeve will be again connected with the justifier cam shaft and will then make another half revolution and come to rest in the position from which we have heretofore traced it. During this second half of the revolution of the justifier cam sleeve, all that is done with the described justifying mechanism is the turning of the cam 1057 so as to move the clamping lever 806 and thereby relieve the slide 801 from its clamping influence.

While the parts of the justifying mechanism have been at work as stated, another line of type containing temporary spaces may have been set up, and the contact bar may have been moved to a position determined by the length of that line.

The justifier shaft and the cam 777 thereon are turned backward, so as to move the contact bar to the proper position for the beginning of a new line by means of a friction driving mechanism which includes a gear 830 (Fig. 5) fixed to the justifier shaft which meshes with a gear 831 whose hub is mounted in a frame member and has fixed to its opposite end a friction cone 833. On the constantly rotating justifier cam shaft 1015 is another cone wheel 832. A third cone 834 is adapted for contact with both of these cone wheels, and thereby to frictionally transmit motion from one to the other. This idler cone 834 is fixed to a sleeve rotatably mounted in a part of the framework, and movable endwise in its bearings. The rod 835 passes axially through this sleeve and the cone, and has on its rear end a stop in the form of a nut to limit its movement. On its front end is a collar 837. Surrounding this rod 835 is a disk 836 between which and the idler cone are antifriction balls. Between this disk and collar is a spring 845. By pressing against the collar 837 this spring is compressed and the idler cone pressed yieldingly into contact with the two cones 832 and 833, and thereby the justifier shaft is turned back to a starting position. When it reaches that position it is stopped positively by means to be presently described. Mounted in suitable bearings adjacent to this justifier shaft is a slide 810 under the influence of a spring plunger 810$^d$ drawing it forward. This plunger is carried on the under side of the slide and engages a part of the justifier frame. One arm 810$^a$ on this slide is adapted to engage with the collar 837; and when the slide is moved rearward it moves said collar in the manner described so as to cause the engagement of the cones described, and the backward turning of the justifier shaft. A roller bearing pin 810$^b$ projecting from this slide extends into the path of a side thrust cam 1081 fixed to the justifier cam sleeve, and during the first half revolution of said cam sleeve this cam acts to move said slide 810 rearward with the result stated, of returning the contact bar to its proper starting point for a new line. Fixed to this same slide 810 is a fork 810$^c$ which enters an annular groove 754$^a$ in the cone 754 loose on shaft 738, and draws that cone rearward. This cone is normally in engagement with a finger 811 on the slide 741, and holding said slide in that position which causes its arm 741$^a$ to engage the spine wheel 740 to connect it with gear 827; but when the cone moves rearward it allows the slide 741 to be moved radially outward by its spring 741$^c$ (Fig. 17) and thereby the spine wheel is freed from the gear 827. Thereupon this spine wheel and the stepped cam 778 may be turned backward by the return movement of the detent rack acting on gear 803$^A$.

When the slide 810 is moved rearward as above stated, it is locked in its rearmost position and held there until the operator begins to set a new line. The mechanism for so locking this slide is a slide 838 mounted in guideways and having at its right end a rearwardly projecting finger 838$^a$. When the slide 810 is in its forward position this finger engages with the right edge thereof and is thereby restrained from movement, but when the slide 810 has moved to its rearmost position the slide 838 moves to the left, and this finger 838$^a$ is carried in front of a shoulder 810$^d$ on the slide 810. The slide 838 is connected at its left end with a lever arm 849 fastened to a rock shaft 850$^a$. Another arm 850 is fast to this same rock shaft and is under the influence of a spring plunger 850$^b$ tending to rock it in that direction, which, through the described mechanism, will move slide 838 to the left. Therefore, when slide 810 moves rearward, as stated, it frees slide 838 which is thereby moved by said spring plunger carrying the finger 838$^a$ into the position where it prevents the forward movement of said slide 810. It remains in this position until released. In the machine shown in my original application this release is automatically effected by mechanism which is essentially a part of the type making mechanism, and is not therefore herein shown in its entirety. This mechanism includes a lever arm 850 which, when moved positively rocks the shaft 850$^a$ so as to move slide 838 to a position where the slide 810 is released. When so released the slide 810 is moved by its spring forward to the position it occupied when we first began to trace its movement. This lever arm 850 extends into the path of a tappet 301$^b$ secured to an endwise movable rod or link 301$^a$ which is connected with one arm of a rocking lever 302. In the type making and setting machine for use with which this justifying mechanism is particularly designed there are means which at the proper time will rock this lever 302 in that direction which will carry the tappet 301$^b$ against the lever arm 850 and thereby rock it in the direction which will cause the described releasing movement of the bar 838.

When the slide 810 returns to its initial position, as stated, the cone 754 is thereby moved forward, and by engaging with the finger 811 on the slide 741, moves said slide so that the overhanging serrated finger 741$^a$ will engage with one or more of the spines 740$^a$ on the spine wheel 740. It will be remembered that the spine wheel, the stepped cam and the sleeve 803 were returned to their initial positions by the return to its initial position of the detent rack. This initial position of the spine wheel is invariably the same, irrespective of the length of the lines. The action of the mechanism, which includes the cone wheels 832, 833, 834, has turned the justifier shaft back to the position it should occupy, and it is positively stopped in that position. This position is different for lines of different lengths. It is after these two mechanisms have been so moved that the slide 810 should be returned to its starting point, and the described mechanism again connects the justifier shaft 738 with the spine wheel and the sleeve 803. This connection is made, whatever be the length of the line, and it is made accurately even if the length of the proposed line be so many "ems" and so many "points" long. It is in order that this connection may be so accurately made that the finger 741$^a$ is provided with serrations one point apart, and the spine wheel is provided with spines one "em" apart.

It might be here stated that the justifier shaft 738 is stopped in the required position by the engagement of a stop finger 812$^a$ with a stop finger 818$^a$. The finger 812$^a$ is fixed to the shaft 828, but adjustably around the same. This shaft has a gear 826 fixed to it, which gear engages with the gear 827 which is fixed to the justifier shaft and carries the clutch slide 741. The specific connection of the stop finger 812$^a$ with the shaft 828 and the particular construction of the part which carries the stop finger 818$^a$ will be described in connection with the mechanism for effecting sectional justification.

While the justifier cam shaft is making its first half revolution a cam 1059 thereon engages a slide 1074 and moves it to the left. A bell crank lever 757 pivoted to a fixture adjacent to this slide has one forked arm which embraces a friction roller carried by the slide, and thereby the bell crank is rocked. The other arm of this bell crank lever engages against the end of the rod 745 which, it will be remembered, is connected with the traveler and thereby pushes the traveler back to its starting position. This bar, it will be remembered, has the arm 745$^a$ which engages in the annular groove 778$^b$ in the stepped eliminator cam 778 and therefore, when the traveler returns to its starting point this stepped cam will move forward on the justifying shaft to its starting point, so that the finger 803$^b$ will be in engagement with the first step on said cam. During this backward movement of the traveler, the rack 759 carried thereby turns backward the pinion 760 and the ratchet 761, which latter ratchet slips under its pawl 762, and assumes a position relative to the escapement ratchet 764, such that when the pallet lever 765 is again operated by the depression of the temporary space key, during the formation of a line, the traveler will get its step by step movement rearward, as before explained.

The following brief review of the movements which take place during the first half revolution of the justifier cam sleeve will be useful. The push stop pawl 536 is released, and thereby the push sleeve is subjected to the influence of the weight to turn it and cause that action of the push which, as has been described, moves the unjustified along word by word while the justifying spaces are formed and put into said line in substitution for the temporary spaces. As the push pawl is released, the detent rack is disconnected from the detent rod so as to permit the detent to be moved to the end of its path ahead of the unjustified line, and to be automatically withdrawn from that position and moved back to its initial position; in which latter movement backward it picks up the detent rack and moves it to its initial position. The divisor frame is released, and under the influence of its weight swings until stopped by the engagement of the raised divisor with the contact bar, thereby permitting the adjustment of the space mold tongue. The slide 801 is clamped in the position to which it has been moved. The divisor frame is returned to its initial position and the raised divisor pushed and latched down. The justifier shaft is disconnected from the spine wheel which permits the latter and the parts connected with it to return to their initial positions, and permits the friction cone mechanism to turn the justifier shaft back to its proper starting point and then permits it to again be connected with the spine wheel. The traveler is returned to its initial position. During the second half revolution of the justifier cam sleeve the slide 801 is unclamped and allowed to move. While these operations which are controlled by the justifier cam sleeve have been going on, the space mold cam sleeve is connected to and disconnected from its shaft, causing the casting of justifying spaces and their insertion into the line. This is repeated as many times as there are temporary spaces in the line. The corresponding number of permanent spaces are formed and put into the line and the line finally pushed into the extension of the type canal behind the galley. Then the push sleeve is, by the action of lug 531 on push rack 519 on the mechanism described, connected with the justifier cam shaft 1015, and thereby the push mechanism is returned to its initial position and the weight, controlling its action in the opposite direction, is wound up on the sprocket.

*Sectional justification.*—The justifying mechanism described may be adapted for justifying lines either as units or in any required number of sections by providing a plurality of stop fingers 812$^a$ as required, angularly adjustable upon the shaft 828, and by providing also coöperating stops like 818$^a$ which will act serially, in coöperation with as many of the stop fingers 812$^a$ as there are to be justified sections in a line. In fact, the machine shown is organized so as to be able to justify lines as units, or in any number of sections up to and including ten. It will, of course, be understood that sectional justification is principally useful for tabulating purposes. The mechanism for adapting the machine to do this work is shown clearly and the description thereof may be followed by reference to Figs. 2, 3, 12 and 46 to 48.

A sleeve 814 is fixed to shaft 828, and has at one end an outwardly projecting flange 814$^a$. A gear 826 fixed to shaft 828, meshes with the gear 827 which has been previously described, and therefore any turning of the justifier shaft is of necessity accompanied by a corresponding turning of the shaft 828. Upon this sleeve 814 ten rings 812 are placed separated from each other by distance disks 813 having a tongue and groove connection with sleeve 814. On each of these rings 812 is an outwardly projecting stop finger 812$^a$. To the rear of this group of disks and rings a clamping collar 815 is placed around sleeve 814, and has a connection therewith which compels them to rotate in unison and allows the collar 815 to move longitudinally on the slide. This connection as shown is a pin 814$^b$ which is fixed to sleeve 814 and fits loosely in a hole in the collar 815. A clamping nut 816 screws into sleeve 814, and thereby this series of disks and collars may be immovably clamped upon sleeve 814, after the various collars have been turned to the required positions to adapt their fingers 812$^a$ to properly serve as stops limiting the backward turning of the justifier shaft.

A sliding bar 818 is rigidly fastened by means of arm 819$^c$ to a slide 819 which is guided and supported upon a fixed frame member. On the two side edges of this slide 819 are the ratchet teeth 819$^a$ and 819$^b$. (See Fig. 3.) A pawl 821 pivoted on a lever 744 is for engagement with the ratchet teeth 819$^a$ on the right edge of the bar 819. The other end of this lever is moved by a spring 744$^a$ to the position where it will engage a side thrust cam 1081$^a$ fixed on the justifier cam sleeve 1071. During the first half revolution of this cam sleeve this lever is rocked by the cam in the right direction and distance to cause slide 819 to be moved by pawl 821 a distance equal to the distance between two adjacent ratchet teeth, which distance is the same as the distance between two adjacent collars 812 before referred to. This, therefore, causes the finger 818$^a$, which is initially in the path of a finger 812$^a$ on one collar 812, to be moved into the path of the corresponding finger on the next adjacent collar.

A pawl 822 is pivoted on a fixed frame member, and is adapted to engage the ratchet teeth 819$^b$ along the left edge of the bar 819 and to thereby prevent its return movement. Adjustably fixed to the bar 819 is a release bar 824, the front edge of which is adjacent to a series of graduation marks 819$^c$ on the bar 819. This bar is adjusted and secured in the position in which its front edge is alined with that one of these graduation marks which correspond with the number of sections in which a line is to be justified. Projecting to the left from this slide 824 is an inclined surface 824ª which, when the slide 819 has made the required number of forward movements, corresponding with the number of justified sections each line is to contain, this incline will strike the toe of the pawl 822 and lift it out of engagement with the ratchet teeth 819ᵇ and thus relieve the bar 819 from its restraining influence. Immediately after the pawl 822 is so lifted a little finger 822ª thereon will be engaged by a shoulder 823ª on a pivoted detent 823. A spring plunger 820 carrried by pawl 822 thrusts against the detent 823, and when pawl 822 has been lifted, as described, swings the detent 823 so that the shoulder 823ª will engage the finger 822ª and hold the detent up. The rear end of the pawl 821 is adapted to be engaged by the inclined face of a fixed block 825 so that, when lever 744 is swung by its spring, this pawl will engage this inclined face and the pawl will be withdrawn from engagement with the ratchet teeth 819ª. This cam 1081ª is of such shape that when the sleeve 1071 comes to rest at the end of either half revolution thereof, the lever 744 is permitted to be rocked by its spring to the position stated. In fact, the pawl 821 remains in engagement with the ratchet teeth 819 only long enough to move the bar 819 forward, and said bar is held in this forward movement by the pawl 822. Obviously, therefore, in the first half of each revolution of the cam sleeve 1071 this bar 819 is moved forward one step carrying the finger 818ª progressively into the path of the fingers 812ª on the collars 812. When it has made a sufficient number of these movements the inclined surface 824ª will, in the next forward movement, strike the toe of the pawl 822, and lift it and thereby release the bar 819, which bar, impelled by its spring 819ᵈ, returns to its initial position in which it is stopped by engagement of bar 819ª with a nut 99ª adjustable on rod 99ᵇ fixed to bracket 99. As it reaches this position a shoulder 819ª on said bar engages with the finger 823ᵇ on the detent 823 and moves it so as to release the pawl 822. Thereupon the spring plunger 820 swings the pawl down into engagement with the ratchet teeth 819ᵇ.

The proper adjustment of the collars 812 is facilitated by the fact that on the peripheries of the flange 814ª and the collar 815 are graduation marks indicating the number of "ems" long of a proposed line or line section. On the peripheries of each of the collars 812 are other graduation marks 812ᵇ. If the unit of these graduations is set in alinement with a graduation indicating a certain number of "ems" on the periphery of the flange 814 and collar 815, a line whose length is equal to that number of ems will be produced. If the proposed line is to be so many "ems" and so many "points" the proper collar 812 should be moved until the proper "point" indicating graduation on the collar is alined with the proper "em" indicating the graduation on the flange 814ª and collar 815. When the proper number of these collars 812 have been properly adjusted, the machine will justify the line in sections which, serially, are of lengths as shown by the graduations on the several collars 812 and flange 814ª. When the required number of sections to make up a line has been justified, the slide 819 and associated parts will be returned to their initial position, as before explained.

It will be understood that if the lines are to be justified as units, the plate 824 is adjusted with its front edge alined with the graduation mark "1" on the bar 819; and therefore the bar 819 will return to its initial position whenever the justifier cam sleeve 1071 completes the first half of a revolution. In other words, the slides 818 and 819 will be moved forward during the early part of the first half revolution of cam sleeve 1071, but will move back again immediately the cam 1081ª releases slide 819. The initial position of the slide 818 is such that its finger 818ª is in the plane of the first collar 812.

The purpose of the engagement of fingers 812ª and 818ª is to limit the backward turning of the justifier shaft, and to thereby properly position the contact bar 799 for the line about to be set and justified. At the beginning of formation of the first section of a line, the engagement of the finger 812ª on the rear collar 812, with finger 818ª, has positioned said contact bar. Now, before the justifier cam sleeve 1071 has completed the first half of that revolution which is incident to the justification of said first section, the bar 818 will have been moved forward one step. When, therefore, the justifier shaft 738 is turned backward by the operation of the friction cone mechanism described, it will be stopped by the engagement of the finger 812ª on the second collar with the finger 818ª. When so stopped the distance between the contact bar 799 and the rear ends of the divisors 779 is equal to the length of the next line section to be formed.

It is conceivable that in using the machine for sectional justification, the sections may be of such relative lengths that the line shortage of one section may be greater than the total length of the next section to be formed. Such conditions will not often exist, but if it does, the contact bar, after it has served its purpose in connection with the first section referred to, would have to move toward the divisor frame in order to assume the required position for beginning the next short section referred to. (See Figs. 1, 5, 6, 7, 8, 10). To provide for this forward movement of the contact bar, said bar is formed with a downwardly projecting flange along its front edge. A gravity pawl 794 is mounted on a horizontal pivot to the rear edge of the divisor frame, and will, when the divisor frame is swung rearward, pass beneath said rib on the contact bar and then fly up behind said rib. When the divisor frame is returned to its normal position, this pawl, by engaging said rib, will draw the contact bar with it until the contact bar has very nearly reached its normal position, at which time a finger 794ª on this pawl 794 will engage with a shoulder 898 and will so swing it as to release its hold upon said rib, whereupon the pawl will pass beneath the rib, and the contact bar will now be free to move rearward to its starting point. If the machine is not being used to justify lines in sections having the relative peculiarity stated, this pawl may be removed, or clamped in an inactive position by the nut 987 on the pivot of said pawl. See Fig. 7.

*Indicators.*—It is desirable and perhaps necessary that means shall be provided by which an operator of machines of this character shall know the length of the line being composed at any time, and what the shortage is, and when it may be properly justified, and when it is over set. It is also desirable that he shall be able to predetermine the limits in the width of justifying spaces which he shall use in justifying lines. Such indicators and mechanism have been provided in the machine shown in the drawings, and will now be described. The description can be followed by particular reference to Figs. 2, 4 and 20 to 32, inclusive.

A maximum and minimum space gage 703 is pivoted on a fixture, the axis being indicated by 703ᶜ (Fig. 24). An arm 704 fixed thereto carries a roller bearing stud 704ª which enters an inclined slot 705ª in a block 705 fixed to the under side of the traveler 753. Therefore, as the traveler moves in its step by step movements, which have been described, this space gage will turn on its pivot approximately equal angular distances for each movement of the traveler. A slot 703ª is formed through this space gage and extends lengthwise thereof. A minimum gage plate 706 is adjustably fixed to the short arm of this gage by means of a stud 708 which passes up through the slot 703ª and through a hole in this gage plate, and a nut 708ª which screws onto the upper end of this stud. On the short arm of the space gage are graduation marks which indicate "points" and fractions thereof of type measurement. (See Fig. 24). On the associated gage plate 706 are graduation marks indicating thousandths of an inch. This plate is moved along the short arm of the space gage until these graduations indicate measurement of the thinnest space which the operator desires to employ in justifying any line. A maximum gage plate 701 is supported on the top of the long arm of the space gage, and is adjustably secured thereto by a stud 707 which goes up through the slot 703ª and through a hole in the gage plate, and has a nut 707ª which screws onto its upper end. The long arm of this gage is graduated, the graduations indicating "points" and fractions thereof of type measurement; and the edge of the gage plate has also marks representing thousandths of an inch. (See Fig. 24). This plate is moved along the long arm of the gage until the graduations on the plate and gage indicate the measurement of the widest space which the operator desires to use in justifying his lines.

Below the space gage and supported on a fixture are two slides 709 and 725. The former slide embraces the tongue 710 and is thereby guided so as to move to right and left only. The slide 725 is mounted in guide grooves (shown in Fig. 4), so that it also moves to right and left only. In the slide 709 is an inclined groove 709ª into which the stud 707 projects. The parts described are so constructed and proportioned, substantially as shown, that each movement of the space gage, which accompanies a movement of the traveler, will move this slide 709 to the right a distance corresponding with the measurement indicated on the long arm of the space gage—that is to say, it will move a distance corresponding with the maximum width of spaces which the operator desires to use in justifying the line.

The lower end of the stud 708 engages with an inclined edge 725ª on the slide 725; and because of the construction and proportion of the said parts, every time the space gage is moved this slide will move to the left a distance corresponding to the indication on the short arm of the space gage—that is to say, it will move a distance equal to the minimum width of the spaces which the operator desires to employ in justifying lines.

The object of moving slide 709 to the right, as stated, is to complete an electric circuit in which some signal, as, for example, an electric lamp 1100 (shown conventionally in Fig. 4) may be placed, which will be lighted and signal the operator when the line has reached a length which will enable it to be justified by using the required number of justifying spaces of the maximum width shown on the space gage. A contact arm 712 is fixed to an insulating block 711 which in turn is fixed to the under side of the slide 709. A metallic block 716 having a downwardly extended contact finger 716ª is secured to but insulated from the rack 714, which rack is mounted in guideways on the under side of the justifier deck and is movable to right and left. Every time a temporary space key is depressed to cause the formation of a temporary space, the slide 709 moves to the right a distance equal to the maximum width of justifying spaces which the operator desires to use. Every time a type is formed and added to the line the rack 714 moves to the left a distance equal to the setwise width of the type so added. This last statement is true only when the line being composed is four inches or less in length. If it be longer than four inches the rack 714 does not begin to move until the uncomposed part of that line is four inches long. When the line reaches justifiable length,—that is to say, when the line shortage is such that the proper number of justifying spaces of the maximum width indicated on the space gage will justify the line, the pins 716$^a$ and 712 will come into contact and thereby the signal light circuit will be completed and the light will flash. In order that the electric circuit may be completed at the time indicated, two contact rails 719 and 720 are fixed to but insulated from the justifier deck, as shown in Fig. 4. One of these is connected with one terminal and the other with the other terminal of a suitable electric circuit in which the indicator 1100 is connected. A brush 713 fixed to the block 716 rides on the rail 720. Another brush 715 fixed to the finger 712 rides against the rail 719. It is evident, therefore, that it needs only the contact of the fingers 712 and 716$^a$ to complete the circuit as stated.

The distance between the fingers 712 and 716$^a$ at the beginning of the composition of a line is equal to the length of the line to be composed, provided that line is four inches long or less than four inches. If the line is four inches or more than four inches long the distance between these two fingers is four inches; but the rack 714 does not begin its movement until the line shortage is four inches. This light rack is movable to right and left in a suitable guideway, and is engaged by a gear 732 which is fixed to the rotatable shaft 871. Fixed to this same shaft is a gear 856 to which is rigidly fastened a sheave 856$^a$. A cord 856$^b$ fixed to and mounted upon this sheave has a weight 856$^c$ secured to its depending end, and this weight tends to so turn shaft 871 that, through the described intermediate mechanism, the light rack 714 is moved to the right back to its initial position when permitted to so act. While a line is being assembled it cannot so act because of the following mechanism, which causes the light rack to move in the contrary direction. The gear 856 is operatively connected by two intermeshing idler pinions 734 (see Fig. 20) with the gear 743 which is loosely mounted on the justifier shaft. Fixed to the justifier shaft is a disk 772 having a pin 772$^a$ projecting toward another disk 771 which is loosely mounted on the justifier shaft. (See Figs. 2 and 4). Between these two disks is a helical spring 770 which is connected at its ends with these two disks and exerts its force to so turn disk 771 as to cause a pin 771$^a$ fixed to disk 771 to engage with the pin 772$^a$ before mentioned,—this spring being strong enough to cause the disk 771 to so move and to thereby move mechanism with which it will thereby become connected. As during the assembling of a line the justifier shaft is turned in proportion to the growing length of the line, exclusive of temporary spaces, the disk 772 will turn in the direction to carry its pin 772$^a$ away from the pin 771$^a$; but the spring 770 will turn disk 771 so as to keep these pins in contact. A pin 771$^b$ is fixed to the disk 771, and extends rearwardly therefrom. When said disk 771 has reached the position it will occupy when the line shortage is four inches or less, this pin 771$^b$ will have engaged with a pin 743$^a$ fixed to and projecting from the gear 743. (See Figs. 2, 4 and 20). The further turning of the disk 771 will turn this gear and therefore through the mechanism which has been described, the gear 856 will be turned with the justifier shaft, the weight supporting cord will be wound on the sheave 856$^a$, the gear 732 will be turned and the light rack 714 will be moved to the left.

The movement of the light rack 714, and the movement in the opposite direction of the slide 709 will, as before stated, cause the fingers 712 and 716$^a$ to come in contact when the line shortage is such that it can be filled out by the required number of justifying spaces of the maximum width indicated by the gage 703, and the signal lamp 799 will be lighted. Generally speaking, the operator will continue to increase the length of the line after this until he completes a syllable, and perhaps until he adds another word, because it is, of course, preferable that the line shall be justified by spacers whose width is intermediate of the maximum and minimum width permitted by the adjustment which has been made.

In order that the operator may know when the line has reached or is about to reach a length which will require for its justification spacers less than the minimum width for which the operator has made his adjustment, an indicator 731$^a$ is provided. This indicator is the forwardly projecting finger fixed to a gear segment 731, the hub 731$^b$ of which is loosely mounted on the hub of an indicator disk 735 which is operatively connected with the justifier shaft 738 and turns with it. Outside of this disk is a fixed index ring 840 having reversely placed indicating marks near its inner and outer edges. (See Fig. 27). The indicating finger 731ª projects forward in the annular space between this disk 735 and ring 840. (See Figs. 11 and 27). The graduation marks on ring 840 indicate "ems" of type measurement. The gear segment 731 engages rack teeth on the lower face of a sliding rack bar 727 mounted in suitable guideways on the justifier deck 87. Rack teeth on the upper edge of this slide engage a gear segment 729ᵇ fixed to a rock shaft 729. Fixed to the other end of this rock shaft is another gear segment 729ᵇ, and this engages with a rack 725ᵇ carried by the slide 725. This slide, it will be remembered, is moved to the left by the action thereon of the stud 708 whenever the space gage is rocked, and each movement of the slide will be equal to the width of the minimum space which the operator desires to employ in justifying his line. The graduations on the inner edge of the ring 840 are such that for each movement of the slide 725 the indicator 731ª will move a distance as indicated by said graduations, equal to the width of said minimum space. The disk 735 is, while the line is being composed, connected with the justifier shaft 738 and turns with it. It has on its face graduations 735ª which are also to be read in connection with the graduations on the inner edge of the ring 840. When the justifier shaft is set for the commencement of a line the zero of these graduations will be opposite that graduation along the inner periphery of the ring 840 which indicates the length of the line about to be set and justified. The turning of the justifier shaft as this line is being composed is, as has been explained, proportionate to the increases in the length of that line produced by the addition of type only thereto. The disk 735 is turned clockwise as the line is being composed, and always its zero of graduation will, when read in connection with the graduations on the inner edge of the ring 840, show what the line shortage then is. The indicator 731ª turns in the contrary direction, and it will indicate by the said graduations on the disk 840 how much of the line shortage will be filled up by adding to the line the required number of justifying spaces of the minimum width. When this indicator 731ª and the zero of the graduations 735ª come into alinement the justification of the line will require the addition to the line of the required number of spaces of the minimum width. It will, of course, be the aim of the operator to stop composing his line before this alinement takes place. If he allows these two indicators to pass one another, the line is overset, and if justifiable at all, will require spaces narrower than those which the operator is willing to use.

A pointer 792 is loosely mounted on the end of the justifier shaft and is under the influence of a torsion spring 736 tending to turn it from right to left back to the zero of graduations along or near the outer edge of the ring 840. When it does so turn and reaches this position, it comes against a stop 750ª. This stop is the forwardly projecting finger of a little slide 750 mounted on the back of the ring 840. The slide has a short slot 750ᵇ through which passes a screw which screws into the ring and holds the plate in place. The plate is freely movable in both directions, but its finger 750ª passes forward through a slot 840ᶜ in the ring 840 and therefore its movement in both directions is limited. This stop is made movable so that when a full seven inch line is being composed the index finger 792 can move throughout a complete circle and come opposite the graduations 42 which means "42 ems," which equals seven inches. If any line a little bit shorter than seven inches is being composed this stop might be an immovable stop.

The pointer 792 is fast to a little flanged collar or hub 792ª surrounding the front end of the justifier shaft 738 behind a nut 864 which is screwed into the end of said shaft. Just behind the collar is a clamping spider 860 which embraces said collar 792ª and lies just behind the flange thereon. Its arms, extending radially therefrom, are provided with rearwardly turned fingers 860ᵇ going through and fitted in holes in the disk 735. The projecting rear ends of these fingers are in contact with a ring 737 which lies in an annular groove 735ᵇ in the disk 735. Connected to the ring is the rod 863, the rear end of which is connected with the slide 810. When this slide has been moved forward by its spring and assumes the position in which gear 827 is clamped to the spine wheel 740, it pushes this rod forward, the rod pushes the ring, and the ring pushes against the fingers of the spider 860; whereupon the spider moves forward and clamps the hub 792ª of the index pointer to the shaft 738. Therefore as the shaft turns during the assembling of a line this pointer turns with it. When this slide 810 moves rearward for the purpose, among other things, of causing the backward turning movement of the justifier shaft to the required position for beginning a new line, it draws back on the rod 863, and thereby this index finger is unclamped. Immediately this is done a tension spring 736 which embraces the shaft and is connected at its ends with the justifier shaft and with the hub 792ª causes said pointer to fly back to the zero point in which it is stopped by engagement with a little stop finger 840ᵉ carried by the index ring. This index ring and its associated indicators are directly in front of the operator. By looking at one, namely, the disk 735, before he begins to set a line, he, knowing the length of lines he wishes to set, can tell whether the contact bar has been moved to the proper position for beginning that line. As he continues to set up a line, by watching the index finger 792, he can tell how much of the line, exclusive of temporary spacers, he has set, and by watching the index 735, he can tell the line shortage at any time. And by watching the indicator 731ª in connection with this indicator disk 735 he can tell when he is in danger of oversetting the line.

In describing the movements of the traveler, and in referring to the necessity, in order to initiate the movement of the justifying mechanism, of depressing the proper justifying key, reference was made to an indicator visible to the operator which should inform him as to which of the justifier keys he should depress. That indicator is, in the form shown, a segment 766 hung on a vertical pivot from the under side of the justifier deck 87, and having on its upper arc-shaped face properly spaced graduations. This indicator is connected off center with the traveler by means of a link 767, so that for each step of movement taken by this traveler this indicator will be swung so as to disclose through a suitable opening in the justifier deck a number representing the number of times the temporary space key has been depressed, and therefore the number of the justifier keys which the operator must depress to initiate the movement of the justifying mechanism. (See Figs. 2 and 41).

Having described my invention, I claim:

1. In justifying mechanism, the combination of a pivoted divisor frame having a short arm of invariable length and a long arm of variable length, means for varying the length of said long arm in accordance with the number of justifying spacers required in the line, a contact bar which is parallel with the long arm of said divisor frame, means for moving said contact bar to positions in which its distance from the divisor frame corresponds with the line shortage, means for swinging said divisor frame until its long arm engages with and is stopped by said bar, and means controlled by the short arm of said divisor frame for determining justifying spacers.

2. In justifying mechanism, the combination of a pivoted divisor frame having a short arm of invariable length, a plurality of movable divisors carried by the long arm of said frame and occupying positions relative to the axis of said frame which are multiples of the length of the short arm of said divisor frame, means for moving any divisor to an operative position, means for swinging said divisor frame, and a stop adapted to be engaged by the displaced divisor, said stop being movable to positions determined by the line shortage, and means controlled by the shaft arm of said divisor frame for determining justifying spacers.

3. In justifying mechanism, the combination of a contact bar adjustable to positions determined by the length of the line to be justified, a pivoted divisor lever, movable divisors carried thereby normally lying out of the plane of said contact bar but severally movable into said plane, means for moving any one of them into the plane of said contact bar, means for swinging said divisor lever to cause the displaced divisor to engage said contact bar, and mechanism operated by said divisor lever to determine the width of justifying spacers.

4. In justifying mechanism, the combination of a contact bar adjustable to positions determined by the length of the line to be justified, a pivoted divisor frame having its short arm connected with mechanism for determining justifying spaces, a plurality of movable divisors carried by the long arm of said divisor frame and placed at distances from the axis of said frame which are multiples of the length of the short arm of said frame, a plurality of justifying keys, and mechanisms by which the operation of any key causes the movement of the associated divisor from its normal position to a position in the plane of said contact bar.

5. In justifying mechanism, a divisor frame having a series of parallel grooves, divisor levers pivoted in said grooves respectively, means for holding the operative ends of said divisor levers in an inoperative position, means for swinging the operative ends of said levers upward when released from restraint, said divisor frame having a short arm whose length is equal to the smallest common divisor of the distances between the axis of said frame and the operative vertical corners of said divisor levers.

6. In justifying mechanism, a divisor frame having a pivoted shaft fixed to it having in its top face a plurality of parallel grooves, divisor levers pivoted on a common axis to said frame and lying in said grooves, the rear ends of all of said divisor levers having vertical angles whose distances from the axis of said frame have a common divisor, means by which the rear ends of said divisor levers are normally held in a certain horizontal plane, means severally engaging with said levers and acting to move their rear ends above said plane, means for releasing any of said levers from restraint, said divisor frame having a vertical corner whose distance from the axis of the divisor frame is equal to the common divisor above referred to.

7. In justifying mechanism, the combination of a pivoted divisor frame, whose short arm is of invariable length, and whose long arm carries means by which the effective length thereof may be made to be as many times the length of the short arm as there are required justifying spaces in the line to be justified, a contact bar adjustable to a position where its distance from the long arm of said frame is equal to the line shortage, and which lies in the horizontal plane adapted to intercept the long arm of the divisor frame after its effective length has been adjusted, means for swinging said divisor frame toward said contact bar, and mechanism engaging with the short arm of said frame for determining the justifying spaces to be employed.

8. In justifying mechanism, the combination of a contact bar adjustable to positions determined by the length of the line to be justified, a pivoted divisor lever, a plurality of divisors pivoted to said lever with their rear ends lying in a vertical plane parallel with the vertical plane in which said contact bar lies, springs severally exerting force on said divisors to swing them into the horizontal plane of said contact bar, a trigger associated with each divisor preventing the springs from moving them, a plurality of justifier keys and mechanism operated thereby for tripping said triggers, means for swinging the divisor lever, after a divisor has been raised, toward said contact bar, and means operated by said divisor lever for determining the width of the justifying spacers.

9. In justifying mechanism, the combination of a contact bar adjustable to positions determined by the length of the line to be justified, a pivoted divisor lever, a plurality of divisors pivoted to said lever with their rear ends lying in a vertical plane parallel with the vertical plane in which said contact bar lies, springs severally exerting force on said divisors to swing them into the horizontal plane of said contact bar, a trigger associated with each divisor preventing the springs from moving them, a plurality of justifier keys and mechanism operated thereby for tripping said triggers, means for swinging the divisor lever after a divisor has been raised toward said contact bar, means operated by said divisor lever for determining the width of the justifying spacers, and means for returning said divisor lever to and holding it in its normal position.

10. In justifying mechanism, the combination of a contact bar adjustable to positions determined by the length of the line to be justified, a pivoted divisor lever, a plurality of divisors pivoted to said lever with their rear ends lying in a vertical plane parallel with the vertical plane in which said contact bar lies, springs severally exerting force on said divisors to swing them into the horizontal plane of said contact bar, a trigger associated with each divisor preventing the springs from moving them, a plurality of justifier keys and mechanism operated thereby for tripping said triggers, means for swinging the divisor lever after a divisor has been raised toward said contact bar, and means operated by said divisor lever for determining the width of the justifying spacers, means for returning said divisor lever to and holding it in its normal position, and mechanism for returning the raised divisor to its normal position.

11. In justifying mechanism, the combination of a pivoted divisor frame, a mold having an adjustable tongue, mechanism intermediate of the short arm of said divisor frame and said mold tongue limiting the outward movement of the latter, a plurality of movable divisors carried by the long arm of said divisor frame and located in positions which are distant from the axis of said frame multiples of the length of the short arm of said frame, a contact bar whose operative face is parallel with the long arm of the divisor frame when the latter is in its normal position, means for moving said contact bar to a position where the distance between said bar and the ends of the divisors carried by said divisor frame is equal to the shortage of a line to be justified, means for swinging said divisor frame toward said contact bar and until the divisor thereon which has been moved from its normal position engages with said contact bar.

12. In justifying mechanism, the combination of a pivoted divisor frame provided with lever arms, means for varying the relative lengths of the lever arms of this frame in accordance with the number of justifying spacers required, a stop adapted to engage with one arm of said frame and movable to positions determined by the line shortage, means for swinging said divisor frame to cause its engagement with said stop, a slide engaging the other arm of said divisor frame, a second slide whose position is determined by the position of the first slide, means for locking the second slide in its adjusted position, and space determining mechanism controlled by the second slide.

13. In justifying mechanism, the combination of a pivoted divisor frame provided with lever arms and means for swinging its long arm through arcs determined by the shortage of the line to be justified, a slide engaging the short arm of said divisor frame, a second slide adapted to engage the other slide and to be positioned thereby, a mold having an adjustable mold tongue and mechanism intermediate of the second slide specified and said mold tongue whereby to limit the outward movement of said tongue.

14. In justifying mechanism, the combination of a pivoted divisor frame provided with lever arms and means for swinging its long arm through arcs determined by the shortage of the line to be justified, a slide engaging the short arm of said divisor frame, a second slide adapted to engage the other slide and to be positioned thereby, a mold having an adjustable mold tongue and mechanism intermediate of the second slide specified and said mold tongue whereby to limit the outward movement of said tongue, and means for automatically locking the second slide referred to for the time being in its adjusted position.

15. In justifying mechanism, the combination of a pivoted divisor frame provided with lever arms, means for swinging its long arm through arcs determined by the shortage of the line to be justified, a slide engaging the short arm of said divisor frame, a second slide adapted to engage the other slide and to be positioned thereby, a rotatable cam, a space mold having an adjustable tongue, a train of mechanism intermediate of said mold tongue and cam, a spring for moving said mechanism in the direction to withdraw the mold tongue and move the terminal member of said train of mechanism toward said cam, some part of said train of mechanism having a shoulder adapted to engage with the second slide specified.

16. In justifying mechanism, the combination of a pivoted divisor frame provided with lever arms, means for swinging its long arm through arcs determined by the shortage of the line to be justified, means for varying the effective length of the long arm of said frame without varying the effective length of the short arm thereof, a slide engaging the short arm of said frame, a spring for maintaining that engagement, a second slide alined with the first slide, a lever pivoted to one slide and adapted to engage with the other, and means for moving this lever into and out of operative positions.

17. In justifying mechanism, the combination of a pivoted divisor frame provided with lever arms, means for swinging its long arm through arcs determined by the shortage of the line to be justified, means for varying the effective length of the long arm of said frame without varying the effective length of the short arm thereof, a slide engaging the short arm of said frame, a spring for maintaining that engagement, a second slide alined with the first slide, a lever pivoted to one slide and adapted to engage with the other, means for moving this lever into and out of operative positions, mold adjusting mechanism adapted for engagement with the second slide, and subject to the influence of a spring acting to move it against said slide.

18. In justifying mechanism, the combination of a pivoted divisor frame provided with lever arms, means for swinging its long arm through arcs determined by the shortage of the line to be justified, means for varying the effective length of the long arm of said frame without varying the effective length of the short arm thereof, a slide engaging the short arm of said frame, a spring for maintaining that engagement, a second slide alined with the first slide, a lever pivoted to one slide and adapted to engage with the other, means for moving this lever into and out of operative positions, mold adjusting mechanism adapted for engagement with the second slide and subject to the influence of a spring acting to move it against said slide, and means for clamping the second slide in its adjusted position.

19. In justifying mechanism, the combination of a pivoted divisor frame having its pivoting shaft rigidly fixed to it, said frame having one arm of invariable length and the other arm capable of being varied in length so that its effective length will be some multiple of the length of the short arm, a contact bar adjustable to positions determined by the length of the line to be justified and adapted to be engaged by the arm of the divisor frame which is of variable length, a cord and weight for turning the divisor frame, a pinion fixed to said shaft, and a cam controlled rack engaging with said pinion.

20. In justifying mechanism, the combination of a pivoted divisor frame having its pivoting shaft rigidly fixed to it, said frame having one arm of invariable length and the other arm capable of being varied in length so that its effective length will be some multiple of the length of the other arm, a contact bar adjustable to positions determined by the length of the line to be justified and adapted to be engaged by the arm of the divisor frame which is of variable length, a cord and weight for turning the divisor frame, a pinion fixed to said shaft, a sliding bar, a spring for moving it in one direction, and cam controlled mechanism for moving it in the opposite direction, said bar having a longitudinal recess, and a rack engaging said pinion occupying said recess, the rack being shorter than the recess.

21. In justifying mechanism, the combination of a pivoted divisor frame having a short arm of invariable length, a plurality of movable divisors carried by the long arm and normally occupying an inoperative position, a series of finger keys severally associated with said divisors, and mechanism whereby the depression of any key will cause the movement into operative position of the corresponding divisor, and means for locking against movement all of said keys but one.

22. In justifying mechanism, the combination of a pivoted divisor frame having a short arm of invariable length, a plurality of movable divisors carried by the long arm and normally occupying an inoperative position, a series of finger keys severally associated with said divisors, mechanism whereby the depression of any key will cause the movement into operative position of the corresponding divisor, and movable means for locking against movement all of said keys but one, which means by its movement successively unlocks the different keys.

23. In justifying mechanism, the combination of a traveler having a longitudinal slot, one edge of which is formed with notches, a space key, means whose operation is controlled by said space key for imparting to said traveler a step by step movement, a plurality of justifier keys passing through said slot and having fingers extending over the notched edge of said traveler, said fingers being adapted respectively to move through the notches when the notches become alined with said fingers.

24. In justifying mechanism, the combination of a traveler, a space key, means whereby the traveler is caused to have step by step movement as the space key is operated, said traveler having a longitudinal slot of which one edge is notched, a plurality of justifier keys passing through said slot and having fingers extended over the notched edge of the traveler, said fingers being adapted respectively to move through said notches when the notches become alined with said fingers, a divisor frame having a short arm of invariable length, and a long arm of variable length, means operated by said keys for varying the length of said long arm, a contact bar adjustable to positions relative to said divisor frame as determined by the length of the line to be justified, means for swinging said divisor frame so as to carry the long arm thereof into contact with said bar, and mechanism whose movement is controlled by the short arm of said divisor frame for determining the sizes of the justifying spacers required.

25. In a machine for justifying type, the combination of a contact bar, means for initially moving said bar to a position determined by the length of the line to be assembled and justified, means by which whenever a type is added to the line and the line is moved a distance equal to the width of said type the contact bar will also be moved a distance equal to the width of said type, a space key, and mechanism intermediate of the space key and contact bar whereby whenever a temporary space is added to the line and the line moved a distance equal to the width of said space no corresponding movement of the contact bar will take place and an adjustable space determining mechanism adapted to have its movement limited by said contact bar.

26. In a machine for justifying type, the combination of a contact bar, means for initially moving said bar to a position determined by the length of the line to be assembled and justified, means by which whenever a type is added to the line and the line is moved a distance equal to the width of said type the contact bar will also be moved a distance equal to the width of said type, a space key, mechanism intermediate of the space key and contact bar whereby whenever a temporary space is added to the line and the line moved a distance equal to the width of said space no corresponding movement of the contact bar will take place, and an adjustable space determining mechanism adapted to have its movement limited by said contact bar.

27. In justifying mechanism, the combination of a type canal in which a line composed of type and temporary spacers may be assembled, a contact bar, means for automatically setting it in a position corresponding with the length of the justified line about to be produced, means for moving said contact bar to a position determined by the aggregate width of the type exclusive of temporary spacers in the composed line to be justified, and adjustable space determining mechanism whose movement is limited by the position of said contact bar.

28. In justifying mechanism, the combination of a type canal in which a line of type and temporary spacers may be assembled, a contact bar, means for moving said contact bar to a position determined by the aggregate width of the type exclusive of temporary spacers in the composed line to be justified, an adjustable space determining mechanism adapted to have its movement limited by said contact bar, mechanism for moving said contact bar in the contrary direction preparatory to the commencement of a line, adjustable stop mechanism limiting the last mentioned movement of the contact bar.

29. In justifying mechanism, the combination of a type canal in which a line of type and temporary spacers may be assembled, a contact bar, means for moving said contact bar a distance determined by the aggregate width of the type exclusive of spacers in the composed line to be justified, mechanism for moving said contact bar in the contrary direction preparatory to the commencement of a line, adjustable stop mechanism limiting said contrary movement of the contact bar, a pivoted divisor frame adapted to be swung until stopped by said contact bar, and mechanism operated by said divisor frame for determining the justified spaces.

30. In justifying mechanism, the combination of a type canal in which a line of type and temporary spacers may be assembled, a contact bar, mechanism by which said bar is moved to a position determined by the aggregate width of the type exclusive of temporary spacers in the line to be justified, friction driving mechanism for initially moving said contact bar in the reverse direction, an adjustable stop limiting said reverse movement, and an adjustable space determining mechanism whose movement is governed by the contact bar when the latter has been positioned in accordance with the length of the line to be justified.

31. In a machine for justifying type, the combination of a justifyer shaft, means for turning said shaft when type are added to a line through arcs proportionate to the width of the type so added, means whereby the addition of temporary spacers to the line will not turn said shaft, a contact bar, and mechanism operated by said shaft for moving the contact bar, an adjustable space determining mechanism whose movement is governed by the contact bar when the latter has been positioned in accordance with the length of the line to be justified.

32. In a machine for justifying type, the combination of a type canal in which type and temporary spacers may be assembled one by one and in which the line may be moved after each addition thereto a distance equal to the width of that addition, a pivoted divisor frame having a short arm of invariable length and carrying on its long arm a plurality of movable divisors which are placed at distances from the axis of said frame which are multiples of the length of the short arm thereof, a contact bar movable toward and from the long arm of said divisor frame, means for initially moving said bar to such position that the distance between it and the long arm of the divisor frame equals the length of the justified line to be produced, means whereby the addition of type to the line and the described movement of the line in said canal will cause movements of said contact bar toward the divisor frame equal to the setwise widths of the type so added, means whereby the addition of temporary spacers to the line and the described movement of the line will cause no movement of said contact bar, means for moving any divisor on said frame into the path of the contact bar, means for swinging the frame to cause the engagement of the moved divisor and contact bar, and mechanism whose position is controlled by the short arm of said divisor frame for determining justifying spacers.

33. In a machine for justifying type, the combination of a type canal in which type and temporary spacers may be assembled one by one and in which the line may be moved after each addition thereto a distance equal to the width of that addition, a pivoted divisor frame having a short arm of invariable length and carrying on its long arm a plurality of movable divisors which are placed at distances from the axis of said frame which are multiples of the length of the short arm thereof, a contact bar movable toward and from the long arm of said divisor frame, means for initially moving said bar to such position that the distance between it and the long arm of the divisor frame equals the length of the justified line to be produced, means whereby the addition of type to the line and the described movement of the line in said canal will cause movements of said contact bar toward the divisor frame equal to the setwise widths of the type so added, finger keys respectively associated with said divisors, means for locking the keys and serially unlocking said keys one at a time whereby that key and that key only which corresponds with the number of spacers required may be operated, mechanisms operated by said keys for causing the movement of the corresponding divisors into operative position, means for swinging said divisor frame to cause the moved divisor to engage said contact bar, and means controlled by the short arm of said divisor frame for determining the justifying spacers.

34. In a machine for justifying type, the combination of a canal in which a line of type and temporary spacers may be assembled and moved, a contact bar, a rotatable justifier shaft, a sleeve thereon having a spiral cam groove, a pin connected with said contact bar entering said spiral groove, and means whereby the movement of the type line in said canal will turn said shaft through an arc which is proportionate to the aggregate width of the type in said line exclusive of temporary spacers in said line and an adjustable space determining mechanism adapted to have its movement limited by said contact bar.

35. In a machine for justifying type, the combination of a justifier shaft, means for turning it, a cam driven by said shaft, a slide movable in a path parallel with said shaft having a part which engages with said cam, and a contact bar connected with said slide.

36. In mechanism for justifying type lines, the combination of means for measuring a line of type and temporary spacers, means for eliminating from that measurement the measurement of the temporary spacers, a contact bar, means for moving the contact bar to a position dependent upon the measurement of the line exclusive of temporary spacers, means for dividing the line shortage as indicated by the position of said contact bar by the number of justifying spacers required, and means for turning said line measuring and eliminating mechanism to an invariable initial position irrespective of the length of the lines being measured, containing means for returning said contact bar to a starting position dependent upon the length of the justified line to be produced.

37. In justifying mechanism, the combination of a rotatable member, means whereby it is turned through arcs proportionate to the widths of type and temporary spacers in a line to be justified, a justifier shaft, driving mechanism intermediate of the justifier shaft and said rotatable member, means whereby said rotatable member is turned to an invariable initial position irrespective of the lengths of the lines to be justified, and mechanism for turning the justifier shaft backward to a position determined by the length of the justified line to be produced.

38. In a machine for justifying type, the combination of type canal in which a line of type and temporary spacers may be assembled and moved, a rotatable member, mechanism by which the same is turned whenever the line is moved along said canal through an arc proportionate to the extent of such movement, a concentrically mounted stepped cam, a shaft upon which said cam is movable lengthwise, connections between said cam and shaft compelling them to rotate in unison, a finger carried by the first named rotatable member adapted for engagement with the steps on said cam to rotate the same, and mechanism for imparting to said stepped cam any desired number of movements lengthwise of the shaft, each movement being equal to the height of a step on said stepped cam.

39. In justifying mechanism, the combination of a canal in which a line of type and temporary spacers may be assembled and moved, a detent engaging the end of the assembled line and adapted to be moved by the line when the line is moved, a detent rack connected with the detent and adapted to be moved thereby, a rotatable pinion engaged by said rack, a finger fixed to said pinion, a justifier shaft concentric with said pinion, a stepped cam movable longitudinally on said justifier shaft and connected thereto so that they may rotate in unison, a space key, and mechanism controlled thereby for moving said stepped cam lengthwise of said shaft.

40. In a machine for justifying type, the combination of a justifier shaft, a contact bar adapted to be moved thereby, a sleeve carrying a finger, a type canal in which a line of type and temporary spacers may be assembled and moved, mechanism whereby the sleeve is turned as the line is moved in said canal arcual distances proportionate to such movements, a stepped cam concentric with said sleeve, a concentric rotatable member, means connecting said member with said stepped cam whereby they must rotate in unison but which permits the stepped cam to move relatively in a longitudinal direction, a space key, mechanism controlled thereby for moving said stepped cam longitudinally, and adjustable driving connections between said rotatable member and said justifier shaft and an adjustable space determining mechanism adapted to have its movement limited by said contact bar.

41. In a machine for justifying type, the combination of a type canal in which a line of type and temporary spacers may be assembled and moved, a justifier shaft, a contact bar adapted to be moved thereby, a sleeve carrying a finger, mechanism whereby said sleeve is turned proportionately to the length of the line made up of type and temporary spacers, a stepped cam concentric with said sleeve and adapted to be engaged by said finger, a concentric rotatable member, means connecting said member and stepped cam in such manner that they must rotate in unison but which permits the stepped cam to move relatively in a longitudinal direction, a space key, and mechanism controlled thereby for moving the stepped cam longitudinally, adjustable driving connections between said rotatable member and the justifier shaft whereby said shaft is turned forward, means for turning the shaft backward, and means to stop the backward turning of said shaft and an adjustable space determining mechanism adapted to have its movement limited by said contact bar.

42. In justifying mechanism, the combination of a justifier shaft, a sleeve carrying a finger, mechanism whereby said sleeve is turned proportionately to the length of an unjustified line made up of type and temporary spacers, a stepped cam concentric with said sleeve, a concentric toothed wheel, means connecting said wheel with said stepped cam whereby they must rotate in unison, but the latter is permitted to move relatively in a longitudinal direction, a space key, and mechanism controlled thereby for moving the stepped cam longitudinally, a gear connected with said justifier shaft, and means carried by said gear engaging said toothed wheel to connect and disconnect them.

43. In justifying mechanism, the combination of a rotatable member, means whereby it is turned proportionately to the length of a line of type and temporary spacers to be justified, a finger fixed to said rotatable member, a concentric rotatable stepped cam adapted to be engaged by said finger, a space key, means controlled thereby for moving the stepped cam longitudinally relative to the first mentioned rotatable member, a toothed wheel concentric with said cam, mechanism transmitting rotary motion from the cam to said toothed wheel, a concentric rotary member, a clutch slide mounted thereon having a serrated flange adapted to engage said toothed wheel, mechanism for operating said slide, a justifier shaft, and driving connections between said justifier shaft and the first mentioned rotatable member.

44. In justifying mechanism, the combination of a rotatable member having a finger, a concentric stepped cam whose steps are adapted to be engaged by said finger, a spring for turning the cam to its initial position, a concentric toothed wheel, a driving connection between said toothed wheel and stepped cam, a justifier shaft, a rotatable member fixed to said shaft carrying a slide adapted to engage said toothed wheel, mechanism for turning said justifier shaft in the reverse direction, a clutch for connecting the justifier shaft with said reversing mechanism, and mechanism for simultaneously operating said clutch and for moving the slide in the disengaging direction.

45. In justifying mechanism, the combination of a justifier shaft, mechanism by which said shaft is turned through arcual distances proportionate to the width of the type only in the line to be justified, means for connecting and disconnecting said mechanism and justifier shaft, means for turning said shaft in the reverse direction, stop mechanism limiting said returning movement, and means for synchronously connecting said shaft with the returning mechanism and disconnecting it from the mechanism for turning it in the first named direction.

46. In justifying mechanism, the combination of a contact bar, means for moving it in one direction a distance proportionate to the aggregate width of the type only in the line to be justified, means for moving said contact bar in the reverse direction in order to position it for beginning a new line, and adjustable mechanism for limiting said reverse movement and an adjustable space determining mechanism adapted to have its movement limited by said contact bar.

47. In justifying mechanism, the combination of a contact bar, means for moving it in one direction a distance proportionate to the aggregate width of type only in the line to be justified, means for moving said contact bar in the reverse direction in order to position it for the beginning of a new line, adjustable mechanism for limiting said reverse movement, said mechanism including a plurality of independently adjustable stops movable in different planes, and a movable coöperating stop adapted to be moved into the path of any of the first mentioned stops and an adjustable space determining mechanism adapted to have its movement limited by said contact bar.

48. In justifying mechanism, the combination of a contact bar, means for moving it in one direction a distance proportionate to the aggregate width of type only in the line to be justified, means for moving said contact bar in the reverse direction in order to position it for the beginning of a new line, adjustable mechanism for limiting said backward movement, said mechanism including a plurality of independently adjustable stops movable in different planes, a movable coöperating stop adapted to be moved into the path of any of the first mentioned stops, and means for imparting to said coöperating stop a step by step movement which will carry it successively into the paths of the several first mentioned stops and an adjustable space determining mechanism adapted to have its movement limited by said contact bar.

49. In mechanism for sectionally justifying lines of type, the combination of a movable member carrying a series of adjustable stops lying and movable in different planes, a movable coöperating stop, and mechanism for imparting thereto step by step movements which carries it successively into the paths of the several stops first mentioned.

50. In mechanism for sectionally justifying lines of type, the combination of a contact bar, means for moving it in one direction a distance proportionate to the aggregate width of type only in the line to be justified, means for moving said contact bar in the reverse direction in order to position it for the beginning of a new line, adjustable mechanism for limiting said backward movement, said mechanism including a plurality of independently adjustable stops movable in different planes and connected by suitable mechanism with the contact bar, a movable coöperating stop adapted to be moved into the path of any of the first mentioned stops and an adjustable space determining mechanism adapted to have its movement limited by said contact bar.

51. In mechanism for sectionally justifying lines of type, the combination of a contact bar, a rotatable justifier shaft, mechanism whereby the turning of the shaft moves the contact bar, means for turning said shaft through an arcual distance proportionate to the aggregate width of the type only in the line to be justified, mechanism for turning said shaft in the contrary direction, a member carrying a series of adjustable stops, means intermediate of the justifier shaft and said member to cause them to move in unison, a movable stop adapted to be successively moved into the paths of the several stops first mentioned so as to be engaged by them, and thereby stop the reverse movement of the justifier shaft and contact bar and an adjustable space determining mechanism adapted to have its movement limited by said contact bar.

52. In justifying mechanism, the combination of a pivoted divisor frame, mechanism operated thereby for determining the justifying spaces to be used in any line, a contact bar movable toward and from said divisor frame, means for initially positioning said bar so that the distance from said divisor frame corresponds with the length of the line to be formed, means for moving said contact bar toward said divisor frame a distance corresponding with the aggregate width of type only in the line to be justified whereby the distance between said contact bar and divisor frame will correspond with the line shortage.

53. In a machine for justifying type lines, the combination of a pivoted divisor frame, a contact bar movable toward and from the same, means whereby said contact bar is moved toward the divisor frame during the assembling of a line of type a distance equal to the aggregate width of the type in said line, mechanism for moving said contact bar in the reverse direction preparatory to the beginning of a line, and adjustable means limiting the last mentioned movement of the contact bar.

54. In a machine for sectionally justifying lines of type, the combination of a pivoted divisor frame, a contact bar movable toward and from the same, means whereby said contact bar is moved toward the divisor frame during the assembling of a line of type, a distance equal to the aggregate width of the type in said line, mechanism for moving said contact bar in the reverse direction preparatory to the beginning of a line, a series of adjustable devices adapted to limit the backward movement of the contact bar, and means whereby said devices are successively caused to operate.

55. In mechanism for justifying line sections, the combination of a device and means whereby it is moved from variable initial positions distances proportionate to the width of the type forming the lines to be justified, means for moving said device in the reverse direction, a plurality of adjustable stops carried by said device, a movable member movable crosswise of the path of said device and adapted to be carried successively into the planes of said adjustable stops, and mechanism which operates automatically whenever any line section is justified to move said member into the path of the next stop on the movable device.

56. In mechanism for justifying line sections, the combination of a line length regulator shaft carrying a series of angularly adjustable fingers, a slide having a finger adapted by the movement of said slide to be carried successively into the path of said adjustable fingers, and mechanism for advancing said slide upon the completion of the justification of any line section to bring its finger in line with a different finger carried by said shaft.

57. In justifying mechanism, the combination of a line length regulator shaft carrying a series of angularly adjustable fingers, a slide having a finger adapted by the movement of said slide to be carried successively into the path of said fingers, mechanism for advancing said slide upon the completion of the justification of any line section, and means for returning said slide to its initial position when all of the sections constituting a line have been justified.

58. In justifying mechanism, the combination of a line length regulator shaft carrying a series of angularly adjustable fingers, a slide having a finger adapted by the movement of said slide to be carried successively into the path of said fingers, mechanism for returning said slide upon the completion of the justification of any line section, a cam, and mechanism operated by said cam for returning said slide in step by step movements.

59. In justifying mechanism, the combination of a line length regulator shaft carrying a series of angularly adjustable fingers, a slide having a finger adapted by the movement of said slide to be carried successively into the path of said fingers, mechanism for returning said slide upon the completion of the justification of any line section, the slide having ratchet teeth along one edge, a pivoted lever carrying an actuating pawl, and means for rocking said lever.

60. In justifying mechanism, the combination of a line length regulator shaft carrying a series of angularly adjustable fingers, a slide having a finger adapted by the movement of said slide to be carried successively into the path of said fingers, mechanism for returning said slide upon the completion of the justification of any line section, said slide having two sets of ratchet teeth, a pawl for engaging one set of ratchet teeth to advance the slide in step by step movements, mechanism for operating said pawl, a detent pawl engaging the other set of said ratchet teeth to prevent the return movement of said slide, and a throw out device adjustably secured to the slide for engaging said detent to prevent its action after it has made the required number of step by step advances.

61. In justifying mechanism, a line length regulator shaft, having fixed to it a disk, a clamping disk movable lengthwise on said shaft and having a tongue and groove connection therewith, and a plurality of disks lying between the two disks specified, each having a projecting stop finger, graduations upon the peripheries of the last mentioned disks, and graduations on the periphery of one of the two disks between which these fingered disks lie, and mechanism for moving the clamping disk toward the fixed disk to clamp the intermediate disks against rotation.

62. In justifying mechanism, a line length regulator shaft, having fixed to it a disk, a clamping disk movable lengthwise on said shaft and having a tongue and groove connection therewith, and a plurality of disks lying between the two disks specified, each having a projecting stop finger, graduations upon the peripheries of the last mentioned disks, and graduations on the periphery of one of the two disks between which these fingered disks lie, mechanism for moving the clamping disk toward the fixed disk to clamp the intermediate disks against rotation, a slide having a finger, and means for moving said slide in step by step movements to carry said finger successively into the paths of the fingers on said disks.

63. In a machine for justifying type, the combination of a justifier shaft, mechanism whereby said shaft is turned proportionately to the aggregate width of type only in a line to be justified, an indicator adjustably secured to said shaft, a coöperating fixed dial, means for turning said justifier shaft in the reverse direction to positions variable in accordance with the length of the line about to be formed, said indicator being adapted to be returned to an invariable initial position, and means for connecting said shaft and indicator after they have been so set.

64. In a machine for justifying type, the combination of a shaft, means for turning it proportionately to the aggregate width of type only in a line to be justified, means for turning said shaft in the reverse direction and for stopping it in various positions dependent upon the length of the line about to be formed, an indicator adjustably secured to said shaft, a coöperating dial, means for disconnecting said indicator and shaft before the shaft begins its return movement, means for automatically returning the indicator to an invariable initial position, and means for automatically connecting said indicator and shaft when both have been set.

65. In a machine for justifying type, the combination of a justifier shaft, mechanism by which said shaft is turned proportionately to the aggregate width of type only in a line to be justified, an indicator permanently fixed to said justifier shaft, and a fixed graduated dial associated with said indicator.

66. In a machine for justifying type, the combination of a justifier shaft, mechanism by which said shaft is turned proportionately to the aggregate width of type only in the line to be justified, an indicator permanently fixed to said justifier shaft, another indicator, a space key, means whereby the last named indicator is moved whenever the space key is depressed a distance proportionate to the width of the minimum space to be used in justifying the line, said two indicators being movable in reverse directions and in juxtaposition to each other.

67. In a machine for justifying type, the combination of a pivoted space gage, means for imparting to it as many equal step by step movements as there are temporary spacers in the line to be justified, an indicator, mechanism operated by said gage for moving said indicator, and a dial associated with the indicator.

68. In a machine for justifying type, the combination of a pivoted space gage, means for imparting to it as many equal step by step movements as there are temporary spacers in the line to be justified, a device adjustable on said gage toward and from its pivot, a minimum space indicator, a dial associated therewith, and mechanism intermediate of said indicator and the adjustable device carried by the space gage.

69. In a machine for justifying type, the combination of a pivoted space gage, a space key, mechanism operated by said space key for imparting step by step movements to said space gage, a device adjustable on said space gage toward and from its pivot, a minimum space indicator, and mechanism intermediate of the minimum space indicator and said adjustable device for operating the former.

70. In a machine for justifying type, the combination of a pivoted space gage, means for turning said gage on its pivot through equal arcs synchronously with the introduction of a temporary space in the line, a device adjustable on said space gage toward and from its pivot, a slide adapted to be moved by said adjustable device, a second slide and means for moving it in the reverse direction distances proportionate to the width of type added to the line, and electrical contacts respectively moved by said two slides toward each other, and an indicator which will be operated when said contacts engage.

71. In justifying mechanism, a pivoted divisor lever, divisors movably supported thereon, a contact bar movable to a position determined by the length of the line to be justified, and mechanism operated by said divisor lever for determining the width of the justifier spaces.

72. In a machine for justifying type, the combination of a pivoted divisor frame, space determining mechanism operated thereby, movable divisors carried by said frame, a contact bar opposed to said divisor frame, means for initially moving said contact bar to a position determined by the length of the line to be formed, means for moving said contact bar toward the divisor frame distances corresponding with the width of type added to the line being composed, means for displacing that divisor which corresponds with the number of spacers required, means for moving the divisor frame to cause the displaced divisor to engage said contact bar, mechanism for restoring the divisor frame to its initial position, and mechanism by which the contact bar is moved nearer the normal position of the divisor frame before said contact bar begins its opposite movement toward the position from which it must start at the beginning of the new line.

73. In a machine for justifying type, the combination of a pivoted divisor frame having an arm of invariable length, space determining mechanism governed by said arm, a plurality of divisors carried by the other arm of said divisor frame, a plurality of divisor keys, divisor trips operated by said keys for causing the displacement of corresponding divisors, a rocking lever adapted to be moved by any of said divisor trips, mechanism adapted to be set in operation by said lever for moving said divisor frame, and a contact bar adjustable to a position corresponding with the length of the line to be justified and adapted to be engaged by the displaced divisor whereby the movement of the divisor frame is stopped.

In testimony whereof, I hereunto affix my signature in the presence of two witnesses.

BENJAMIN F. BELLOWS.

Witnesses:
H. W. GOODWIN,
JOHN PARKER.